(12) United States Patent
Yuasa et al.

(10) Patent No.: US 9,701,214 B2
(45) Date of Patent: Jul. 11, 2017

(54) INFORMATION SHARING SYSTEM, ON-VEHICLE DIAGNOSIS TERMINAL, AND DISPLAY TERMINAL

(71) Applicant: NGK SPARK PLUG CO., LTD., Nagoya-shi, Aichi (JP)

(72) Inventors: Go Yuasa, Ranchopalos Verdes, CA (US); Michael J. Ramirez, West Hollywood, CA (US); Masashi Tsuzuki, Nagoya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 74 days.

(21) Appl. No.: 14/690,939

(22) Filed: Apr. 20, 2015

(65) Prior Publication Data
US 2015/0302668 A1 Oct. 22, 2015

Related U.S. Application Data

(60) Provisional application No. 61/982,005, filed on Apr. 21, 2014.

(51) Int. Cl.
*B60L 11/18* (2006.01)
*H04L 29/08* (2006.01)

(52) U.S. Cl.
CPC ........ *B60L 11/1861* (2013.01); *H04L 67/104* (2013.01); *H04L 67/12* (2013.01)

(58) Field of Classification Search
CPC .... B60L 11/1861; H04L 67/12; H04L 67/104; Y02T 90/16; Y02T 10/7005
See application file for complete search history.

(56) References Cited

U.S. PATENT DOCUMENTS

| 2003/2366601 | 12/2003 | McLeod et al. |
| 2006/0052918 A1 | 3/2006 | McLeod et al. |
| 2006/0220809 A1 * | 10/2006 | Stigall .................... G07B 15/00 340/438 |

FOREIGN PATENT DOCUMENTS

JP 2005521170 A 7/2005

* cited by examiner

*Primary Examiner* — Mussa A Shaawat
*Assistant Examiner* — Michael Kerrigan
(74) *Attorney, Agent, or Firm* — Sughrue Mion, PLLC

(57) ABSTRACT

An information sharing system including a plurality of on-vehicle diagnosis terminals and one or more of display terminals sharing diagnostic information over wireless communication. The respective terminals store, in a storing unit, data sets, also stored in another terminal with which communication was established, and a stored clock time. The terminals include a communication-establishing unit that includes a searching unit and an establishing unit. The searching unit is configured to search an planned-connection terminal capable of establishing communication with the terminal, and that does not yet have a stored clock time, or the stored clock time that is stored in the on-vehicle diagnosis terminal and from which a predetermined time has passed, and the establishing unit is configured to establish communication with the planned-connection terminal.

12 Claims, 22 Drawing Sheets

INFORMATION SHARING SYSTEM, ON-VEHICLE DIAGNOSIS TERMINAL, AND DISPLAY TERMINAL

BACKGROUND OF THE INVENTION

1. Field of the Invention

The present invention relates to an information sharing system that includes a plurality of on-vehicle diagnosis terminals for acquiring diagnostic information on electric vehicles, and one or a plurality of display terminals for displaying the diagnostic information on the electric vehicles equipped with the on-vehicle diagnosis. The information sharing system shares the diagnostic information among the terminals. The present invention also relates to an on-vehicle diagnosis terminal and a display terminal for use in the information sharing system.

2. Description of the Related Art

Electric vehicles, such as golf carts used on golf courses and electric carts used in hospital facilities and retirement communities, include not only an electric motor as a driving source for running, but also a battery for supplying electric power to the electric motor. Thus, it is desirable to collect and control diagnostic information such as the charge state of the electric vehicle battery so as to allow for continued running on golf courses or other facilities. Patent Document 1 discloses a remote diagnostic system that allows for monitoring of diagnostic data on vehicles as described above.

[Patent Document 1] JP-T-2005-521170

Problems to be Solved by the Invention

In the remote diagnostic system of Patent Document 1, while remote devices are mounted to vehicles, a base station is separately provided. Further, diagnostic information on the vehicles that is collected is centrally controlled at the base station.

In the case of employing a system of centrally collecting information at the base station or at another centralized control system as described above, the information cannot be acquired if wireless communication cannot be performed directly between the remote devices mounted to the vehicles and the base station or the other centralized control system.

In addition, information sharing systems in which communication among terminals is carried out to share diagnostic information of electric vehicles may be contemplated.

However, in those systems, terminals that have already acquired diagnostic information from each other are less likely to acquire new information by again communicating at a subsequent timing without allowing a long time to elapse, causing acquisition of new diagnostic information by communication with other terminals to be delayed.

SUMMARY OF THE INVENTION

The present invention has been made in view of the above problems, and an objective thereof is to provide an information sharing system by which diagnostic information can be shared among terminals, the system reducing needless communication among the terminals and driving acquisition of new diagnostic information, and an on-vehicle diagnosis terminal and a display terminal used in the information sharing system.

The above objective has been achieved by providing, in a first aspect of the invention (1) an information sharing system comprising a plurality of on-vehicle diagnosis terminals, and one or a plurality of display terminals, the on-vehicle diagnosis terminals and the one or the plurality of display terminals comprising a terminal that comprises a communication unit including one of first and second communication units configured to perform peer-to-peer wireless communication, the on-vehicle diagnosis terminals comprising: the first communication unit; and a diagnostic information-acquiring unit configured to acquire diagnostic information on an electric vehicle equipped with the on-vehicle diagnosis terminal, the one or the plurality of display terminals comprising: the second communication unit; and a display configured to display the diagnostic information on the electric vehicles equipped with the on-vehicle diagnosis terminals, the on-vehicle diagnosis terminals and the one or the plurality of display terminals sharing the diagnostic information on the electric vehicles equipped with the on-vehicle diagnosis terminals over wireless communication among the terminals, which is performed using the communication units, wherein the on-vehicle diagnosis terminals comprise: a first clock unit that keeps a common time that is unified in the information sharing system; an own-vehicle data-storing unit configured to store an own-vehicle data set that comprises a data set comprising a unique identifier that is uniquely assigned to the on-vehicle diagnosis terminal, the diagnostic information acquired by the diagnostic information-acquiring unit of the on-vehicle diagnosis terminal, and an acquisition clock time in the common time at which the diagnostic information is acquired; and an other-vehicle data-storing unit configured to store other-vehicle data sets that comprise the data sets on other electric vehicles that are acquired through the first communication unit of the on-vehicle diagnosis terminal, wherein the one or the plurality of display terminals comprise: a second clock unit that keeps the common time; and a data-storing unit configured to store the data sets on the electric vehicles that are acquired through the second communication unit of the display terminal, wherein the on-vehicle diagnosis terminals comprise: a first communication-establishing unit configured to establish peer-to-peer wireless communication with the communication units of the terminals capable of establishing wireless communication with the on-vehicle diagnosis terminal; a first newly-storing unit configured to make the other-vehicle data-storing unit of the on-vehicle diagnosis terminal store a data set comprising a unique identifier that is not stored in the other-vehicle data-storing unit of the on-vehicle diagnosis terminal among the data sets stored in first terminals that comprise the terminals where wireless communication has been established with the on-vehicle diagnosis terminal; a first renewing-and-storing unit configured to make the other-vehicle data-storing unit of the on-vehicle diagnosis terminal renew and store the data set that comprises the unique identifier which is the same as the unique identifier of the other-vehicle data set stored in the other-vehicle data-storing unit of the on-vehicle diagnosis terminal, and has a newer acquisition clock time among the data sets stored in the first terminals; and a first clock time-storing unit configured to renew and store, every time the data sets stored in each first terminal are stored in the other-vehicle data-storing unit of the on-vehicle diagnosis terminal, a first stored clock time in the common time for every first terminal, the first stored clock time being the time of storage, wherein the one or the plurality of display terminals comprise: a second communication-establishing unit configured to establish peer-to-peer wireless communication with the communication units of the terminals capable of establishing wireless communication with the display terminal; a second newly-storing unit configured to make the data-storing unit of the display terminal store a data set comprising a unique identifier which is the that is not stored in the data-storing unit of the display terminal among the data sets stored in second terminals that comprise the terminals where wireless communication has been established with the display terminal; a second renewing-and-storing unit configured to renew and store the data set that comprises the unique identifier which is the same as the unique identifier of the data set stored in the data-storing unit of the display terminal, and has a newer acquisition clock time among the data sets stored in the second terminals; and a second clock time-storing unit configured to renew and store, every time the data sets stored in each second terminal are stored in the data-storing unit of the display terminal, a second stored clock time in the common time for every second terminal, the second stored clock time being the time of storage, wherein the first communication-establishing units of the on-vehicle diagnosis terminals comprise: a first searching unit configured to search a first planned-connection terminal among the terminals, the first planned-connection terminal being capable of establishing wireless communication with the on-vehicle diagnosis terminal, the first planned-connection terminal comprising one of not having a first stored clock time stored in the on-vehicle diagnosis terminal, or a first stored clock time that is stored in the on-vehicle diagnosis terminal and from which a first predetermined time has passed at the time of searching; and a first establishing unit configured to establish peer-to-peer wireless communication with the communication unit of the first planned-connection terminal, and wherein the second communication-establishing units of the display terminals comprise: a second searching unit configured to search a second planned-connection terminal among the terminals, the second planned-connection terminal being capable of establishing wireless communication with the display terminal, the second planned-connection terminal comprising one of not having a second stored clock time stored in the display terminal, or a second stored clock time that is stored in the display terminal and from which a second predetermined time has passed at the time of searching; and a second establishing unit configured to establish peer-to-peer wireless communication with the communication unit of the second planned-connection terminal.

The information sharing system (1) defines a system in which the on-vehicle diagnosis terminals and the display terminals share the diagnostic information on the electric vehicles over wireless communication among the terminals, which is performed using the communication units.

The on-vehicle diagnosis terminals, each terminal having an other-vehicle data-storing unit, sequentially replace other-vehicle data sets with the new data sets over wireless communication, each other-vehicle data set being stored in the other-vehicle data-storing unit, and each new data set being stored in any other terminal (the terminal other than the on-vehicle diagnosis terminal). In addition, the display terminal also sequentially replaces the data sets stored in the data-storing unit with the new data sets stored in any other terminal (the terminal other than the display terminal). Thus, the terminals can share the data sets containing the diagnostic information, including that of the terminals with which direct communication cannot be made but where the data set is shared via any of the other terminals, so that each of the terminals can directly or indirectly acquire and share the data sets containing the diagnostic information that each of the on-vehicle diagnosis terminals has acquired. Thus, an information sharing system is configured in which the diagnostic information on the electric vehicles is shared among the terminals. In addition, the display terminal is capable of displaying the acquired diagnostic information on the display.

In addition, in the information sharing system, in establishing wireless communication, each of the on-vehicle diagnosis terminals searches the first planned-connection terminal that is capable of establishing wireless communication and does not yet have a first stored clock time, or the first stored clock time that is stored and from which the first predetermined time has passed. Then, each of the on-vehicle diagnosis terminals establishes wireless communication with the first planned-connection terminal. In addition, each of the display terminals searches the second planned-connection terminal that is capable of establishing wireless communication and has the second stored clock time that is not yet stored, or the second stored clock time that is stored and from which the second predetermined time has passed. Then, each of the display terminals establishes wireless communication with the second planned-connection terminal.

Thus, in the information sharing system, the on-vehicle diagnosis terminals and the display terminals do not establish wireless communication with the same terminals within the first predetermined time and the second predetermined time, which can reduce needless communication among the terminals. This configuration can increase the chances of performing communication with different terminals, which can promote sharing of the data sets.

Examples of the electric vehicles include golf carts used on golf courses, and electric carts used in hospital or amusement park facilities and retirement communities.

In addition, examples of the diagnostic information include the states of charge (SOC) of the batteries of the electric vehicles, the temperature of the respective batteries, and air pressure in the tires.

In addition, examples of the peer-to-peer wireless communication by the communication units used in the system include wireless communication in accordance with a communication protocol such as an operation mode called an ad hoc mode in an IEEE 802.11 wireless LAN protocol, and Wi-Fi Direct (trade name) formulated by the Wi-Fi Alliance.

In addition, examples of the display terminals include a tablet terminal and a PC terminal.

In a preferred embodiment (2) of the information sharing system (1) above, the first searching units of the on-vehicle diagnosis terminals comprise: a first communicable terminal list-making unit configured to search first communicable terminals capable of establishing wireless communication with the on-vehicle diagnosis terminal, and to make a first communicable terminal list; and a first selecting unit configured to select one first planned-connection terminal from the first communicable terminal list, and wherein the second searching units of the display terminals comprise: a second communicable terminal list-making unit configured to search second communicable terminals capable of establishing wireless communication with the display terminal, and to make a second communicable terminal list; and a second selecting unit configured to select one second planned-connection terminal from the second communicable terminal list.

In the information sharing system (2), each of the on-vehicle diagnosis terminals first makes a list of the first communicable terminals. Thus, when establishing wireless communication with a first planned-connection terminal with use of the first establishing unit, each of the on-vehicle diagnosis terminals can select an appropriate first communicable terminal as the first planned-connection terminal with which to perform connection-establishment processing. In addition, each of the display terminals first makes a list of the second communicable terminals. Thus, when establishing wireless communication with a second planned-connection terminal with the use of the second establishing unit, each of the display terminals can select an appropriate second communicable terminal as the second planned-connection terminal with which to perform connection-establishment processing.

In another preferred embodiment (3) of the information sharing system (2) above, the on-vehicle diagnosis terminals comprise a third selecting unit configured to select, when the wireless communication with the communication unit of the first planned-connection terminal could not be established with use of the first establishing unit, another first planned-connection terminal from the first communicable terminal list, and wherein the display terminals comprise a fourth selecting unit configured to select, when the wireless communication with the communication unit of the second planned-connection terminal could not be established with use of the second establishing unit, another second planned-connection terminal from the second communicable terminal list.

In the information sharing system (3), when wireless communication could not be established with the selected first planned-connection terminal, each of the on-vehicle diagnosis terminals selects a different first planned-connection terminal with use of the third selecting unit. Thus, each of the on-vehicle diagnosis terminals can easily establish wireless communication with a first planned-connection terminal. In addition, when wireless communication could not be established with the selected second planned-connection terminal, each of the display terminals selects another second planned-connection terminal with use of the fourth selecting unit. Thus, each of the display terminals can easily establish wireless communication with a second planned-connection terminal.

In yet another preferred embodiment (4) of the information sharing system (3) above, when wireless communication with the communication unit of the first planned-connection terminal could be established with use of the first establishing unit, each of the on-vehicle diagnosis terminals is configured to select a different first establishment-planned terminal with use of the third selecting unit, and wherein when the wireless communication with the communication unit of the second planned-connection terminal could be established with use of the second establishing unit, each of the display terminals is configured to select a different second planned-connection terminal with use of the fourth selecting unit.

In the information sharing system (4), also in the case where wireless communication could be established with use of the first establishing unit, each of the on-vehicle diagnosis terminals, when it selects another first planned-connection terminal from the first communicable terminal list, uses the third selecting unit. Thus, each of the on-vehicle diagnosis terminals can efficiently select the first planned-connection terminal using the first communicable terminal list, and can establish wireless communication. In addition, also in the case where wireless communication could be established with use of the second establishing unit, each of the display terminals, when it selects another second planned-connection terminal from the second communicable terminal list, uses the fourth selecting unit. Thus, each of the display terminals can efficiently select the second planned-connection terminal using the second communicable terminal list, and can establish wireless communication.

In yet another preferred embodiment (5) of the information sharing system (2) above, the first selecting units of the on-vehicle diagnosis terminals comprise: a first passage list-making unit configured to make, from the first communicable terminal list, a first passage terminal list of first passage terminals comprising one of not having a first stored clock time stored in the on-vehicle diagnosis terminal, or a first stored clock time that is stored in the on-vehicle diagnosis terminal and from which the first predetermined time has passed at the time of list making; and a first terminal selecting unit configured to select one first planned-connection terminal from the first passage terminal list, and wherein the second selecting units of the display terminals comprise: a second passage list-making unit configured to make, from the second communicable terminal list, a second passage terminal list of second passage terminals comprising one of not having a second stored clock time stored in the display terminal, or a second stored clock time that is stored in the display terminal and from which the second predetermined time has passed at the time of list making; and a second terminal selecting unit configured to select one second planned-connection terminal from the second passage terminal list.

In the information sharing system (5), each of the on-vehicle diagnosis terminals makes a first passage terminal list from the first communicable terminal list. The first passage terminals define the first communicable terminals, and define terminals not yet having the first stored clock time stored in the on-vehicle diagnosis terminal, or the first stored clock time that is stored in the on-vehicle diagnosis terminal and from which the first predetermined time has passed at the time of the making of the first passage terminal list. Thus, any of the first passage terminals in the first passage terminal list can be selected and used as-is, as the first planned-connection terminal to establish wireless communication, so that the first planned-connection terminal can be easily selected. In addition, each of the display terminals makes a second passage terminal list from the second communicable terminal list. The second passage terminals define the second communicable terminals, and define terminals not yet having the second stored clock time stored in the display terminal, or the second stored clock time that is stored in the display terminal and from which the second predetermined time has passed at the time of the making of the second passage terminal list. Thus, any of the second passage terminals in the second passage terminal list can be selected and used as-is, as the second planned-connection terminal to establish wireless communication, so that the second planned-connection terminal can be easily selected.

In yet another preferred embodiment (6) of the information sharing system (5) above, the on-vehicle diagnosis terminals comprises a third terminal selecting unit configured to select, when wireless communication with the communication unit of the first planned-connection terminal could not be established with use of the first establishing unit, another first planned-connection terminal from the first passage terminal list, and the display terminals comprise a fourth terminal selecting unit configured to select, when wireless communication with the communication unit of the second planned-connection terminal could not be established with use of the second establishing unit, another second planned-connection terminal from the second passage terminal list.

In the information sharing system (6), when wireless communication could not be established with the selected first planned-connection terminal, each of the on-vehicle diagnosis terminals selects another first planned-connection terminal with use of the third selecting unit. Thus, each of the on-vehicle diagnosis terminals can easily establish wireless communication with the first planned-connection terminal. In addition, when wireless communication could not be established with the selected second planned-connection terminal, each of the display terminals selects another second planned-connection terminal with use of the fourth selecting unit. Thus, each of the display terminals can easily establish wireless communication with the second planned-connection terminal.

In yet another preferred embodiment (7) of the information sharing system (6) above, also in the chase where wireless communication with the communication unit of the first planned-connection terminal could be established with the use of the first establishing unit, each of the on-vehicle diagnosis terminals is configured to, when selecting another first planned-connection terminal, use the third terminal selecting unit, and also in the case where wireless communication with the communication unit of the second planned-connection terminal could be established with use of the second establishing unit, each of the display terminals is configured to, selecting another second planned-connection terminal, use the fourth terminal selecting unit.

In the information sharing system (7), also in the case where wireless communication could be established with use of the first establishing unit, each of the on-vehicle diagnosis terminals, when it selects another first planned-connection terminal from the first passage terminal list, uses the third terminal selecting unit. Thus, each of the on-vehicle diagnosis terminals can efficiently select the first planned-connection terminal using the first passage terminal list, and can establish wireless communication. In addition, also in the case where wireless communication could be established with use of the second establishing unit, each of the display terminals, when it selects another second planned-connection terminal from the second passage terminal list, uses the fourth terminal selecting unit. Thus, each of the display terminals can efficiently select the second planned-connection terminal using the second passage terminal list, and can establish the wireless communication.

In yet another preferred embodiment (8) of the information sharing system (1) above, the one or the plurality of display terminals comprise a plurality of display terminals, and each of the second communication-establishing units of the display terminals establishes wireless communication with any one of the first communication units of the on-vehicle diagnosis terminals and the second communication units of the display terminals.

In the information sharing system (8), the plurality of display terminals are included, and the second searching units of the display terminals are capable of establishing wireless communication not only with the first communication units of the on-vehicle diagnosis terminals, but also with the second communication units of any other display terminals as the communication units of the terminals capable of performing wireless communication with the second searching units. This configuration allows the display terminals to acquire the data sets stored in any other display terminals, so that the information on the data sets can easily migrate from the terminals including the display terminals to any other terminals, to thereby promote data sharing.

In yet another preferred embodiment (9) of the information sharing system (1) above, the diagnostic information-acquiring units of the on-vehicle diagnosis terminals comprise an SOC information-acquiring unit configured to acquire information on the state of charge of a battery mounted to the electric vehicle equipped with the diagnostic information-acquiring unit.

In the information sharing system (9), the diagnostic information-acquiring units of the on-vehicle diagnosis terminals each include an SOC information-acquiring unit configured to acquire the states of charge (SOC) of the batteries mounted to the electric vehicles. That is, the diagnostic information-acquiring units diagnose the states of charge (SOC) of the batteries mounted to the electric vehicles via the diagnostic information. This configuration allows a controller of the electric vehicles to properly control the states of charge (SOC) of the electric vehicles by charging the batteries before the electric vehicles become inoperable, or by changing the electric vehicles out for electric vehicles which are charged.

In yet another preferred embodiment (10) of the information sharing system (1) above, each of the first clock units and the second clock units keeps a local time used only in the information sharing system as the common time.

In the information sharing system (10), because the first clock units and the second clock units keep a local time used only in the information sharing system as the common time that is unified in the information sharing system, the system does not depend on a remote clock such as a GPS satellite or on a clock time acquired by Internet connection when setting the common time. In addition, this configuration allows the system to be used both indoors and outdoors.

In a second aspect (11), the present invention provides an on-vehicle diagnosis terminal for use in an information sharing system comprising a plurality of on-vehicle diagnosis terminals, and one or a plurality of display terminals, the on-vehicle diagnosis terminals and the one or the plurality of display terminals comprising a terminal that comprises a communication unit including one of first and second communication units configured to perform peer-to-peer wireless communication, wherein the on-vehicle diagnosis terminals comprise: the first communication unit; and a diagnostic information-acquiring unit configured to acquire diagnostic information on an electric vehicle equipped with the on-vehicle diagnosis terminal, wherein the one or the plurality of display terminals comprise: the second communication unit; and a display configured to display the diagnostic information on the electric vehicles equipped with the on-vehicle diagnosis terminals, the on-vehicle diagnosis terminals and the one or the plurality of display terminals sharing the diagnostic information on the electric vehicles equipped with the on-vehicle diagnosis terminals over wireless communication among the terminals, which is performed using the communication units, wherein the on-vehicle diagnosis terminal used in the information sharing system comprises: a first clock unit that keeps common time that is unified in the information sharing system; an own-vehicle data-storing unit configured to store an own-vehicle data set that comprises a data set comprising a unique identifier that is uniquely assigned to the on-vehicle diagnosis terminal, the diagnostic information acquired by the diagnostic information-acquiring unit of the on-vehicle diagnosis terminal, and an acquisition clock time in the common time at which the diagnostic information is acquired; an other-vehicle data-storing unit configured to store other-vehicle data sets that comprise the data sets on other electric vehicles that are acquired through the first communication unit of the on-vehicle diagnosis terminal; a first communication-establishing unit configured to establish peer-to-peer wireless communication with the communication units of the terminals capable of establishing wireless communication with the on-vehicle diagnosis terminal; a first newly-storing unit configured to make the other-vehicle data-storing unit of the on-vehicle diagnosis terminal store a data set comprising a unique identifier that is not stored in the other-vehicle data-storing unit of the on-vehicle diagnosis terminal among the data sets stored in first terminals that comprise the terminals where wireless communication has been established with the on-vehicle diagnosis terminal; a first renewing-and-storing unit configured to make the other-vehicle data-storing unit of the on-vehicle diagnosis terminal renew and store the data set that comprises the unique identifier which is the same as the unique identifier of the other-vehicle data set stored in the other-vehicle data-storing unit of the on-vehicle diagnosis terminal, and has a newer acquisition clock time among the data sets stored in the first terminals; and a first clock time-storing unit configured to renew and store, every time the data sets stored in each first terminal are stored in the other-vehicle data-storing unit of the on-vehicle diagnosis terminal, a first stored clock time in the common time for every first terminal, the first stored clock time being the time of storage, and wherein the first communication-establishing unit of each of the on-vehicle diagnosis terminals comprises: a first searching unit configured to search a first planned-connection terminal among the terminals, the first planned-connection terminal being capable of establishing wireless communication with the on-vehicle diagnosis terminal, the first planned-connection terminal comprising one of not having a first stored clock time stored in the on-vehicle diagnosis terminal, or a first stored clock time that is stored in the on-vehicle diagnosis terminal and from which a first predetermined time has passed at the time of searching; and a first establishing unit configured to establish peer-to-peer wireless communication with the communication unit of the first planned-connection terminal.

The on-vehicle diagnosis terminals (11), each terminal having an other-vehicle data-storing unit, sequentially replace other-vehicle data sets with the new data sets, each other-vehicle data set being stored in the other-vehicle data-storing unit, and each new data set being stored in any other terminal (the terminal other than the on-vehicle diagnosis terminal) over wireless communication. Thus, the terminals can share the data sets containing the diagnostic information, including that of the terminals with which direct wireless communication cannot be made but the data set being shared via any other terminals, so that each of the terminals can directly or indirectly acquire and share the data sets containing the diagnostic information that each of the on-vehicle diagnosis terminals has acquired.

In addition, the on-vehicle diagnosis terminals establish new wireless communication with any other terminals that are capable of performing communication therewith without repeatedly acquiring the data sets from the same terminals within the first predetermined time. This configuration allows the information sharing system to reduce needless communication between the on-vehicle diagnosis terminals and any other terminals and promote acquisition of new diagnostic information.

In a third aspect (12), the present invention provides a display terminal for use in an information sharing system comprising a plurality of on-vehicle diagnosis terminals including one of first and second communication units, and one or a plurality of display terminals, the on-vehicle diagnosis terminals and the one or the plurality of display terminals comprising a terminal that comprises a communication unit configured to perform peer-to-peer wireless communication, wherein the on-vehicle diagnosis terminals comprise: the first communication unit; a diagnostic information-acquiring unit configured to acquire diagnostic information on an electric vehicle equipped with the on-vehicle diagnosis terminal; a first clock unit that keeps common time that is unified in the information sharing system; an own-vehicle data-storing unit configured to store an own-vehicle data set that comprises a data set comprising a unique identifier that is uniquely assigned to the on-vehicle diagnosis terminal, the diagnostic information acquired by the diagnostic information-acquiring unit of the on-vehicle diagnosis terminal, and an acquisition clock time in the common time at which the diagnostic information is acquired; and an other-vehicle data-storing unit configured to store other-vehicle data sets that comprise the data sets on other electric vehicles that are acquired through the first communication unit of the on-vehicle diagnosis terminal, wherein the one or the plurality of display terminals comprise: the second communication unit; and a display configured to display the diagnostic information on the electric vehicles equipped with the on-vehicle diagnosis terminals, the on-vehicle diagnosis terminals and the one or the plurality of display terminals sharing the diagnostic information on the electric vehicles equipped with the on-vehicle diagnosis terminals over wireless communication among the terminals, which is performed using the communication units, wherein the display terminal used in the information sharing system comprises: a second clock unit that keeps the common time; a data-storing unit configured to store data sets on the electric vehicles that are acquired through the second communication unit of the display terminal; a second communication-establishing unit configured to establish peer-to-peer wireless communication with the communication units of the terminals capable of establishing wireless communication with the display terminal; a second newly-storing unit configured to make the data-storing unit of the display terminal store a data set comprising a unique identifier that is not stored in the data-storing unit of the display terminal among the data sets stored in second terminals that comprise the terminals where wireless communication has been established with the display terminal; a second renewing-and-storing unit configured to make the data-storing unit of the display terminal renew and store the data set that comprises the unique identifier which is the same as the unique identifier of the data set stored in the data-storing unit of the display terminal, and has a newer acquisition clock time among the data sets stored in the second terminals; and a second clock time-storing unit configured to renew and store, every time the data sets stored in each second terminal are stored in the data-storing unit of the display terminal, a second stored clock time in the common time for every second terminal, the second stored clock time being the time of storage, and wherein the second communication-establishing unit of the display terminal comprises: a second searching unit configured to search a second planned-connection terminal among the terminals, the second planned-connection terminal being capable of establishing wireless communication with the display terminal, the second planned-connection terminal comprising one of not having a second stored clock time stored in the display terminal, or a second stored clock time that is stored in the display terminal and from which a second predetermined time has passed at the time of searching; and a second establishing unit configured to establish peer-to-peer wireless communication with the communication unit of the second planned-connection terminal.

The display terminal sequentially replaces the data sets stored in the data-storing unit of the display terminal with the new data sets stored in any other terminal (the terminal other than the display terminal) over wireless communication. Thus, the terminals can share the data sets containing the diagnostic information, including that of the terminals with which direct wireless communication cannot be made but the data set being shared via any other terminals, so that each of the terminals can directly or indirectly acquire and share the data sets containing the diagnostic information that each of the on-vehicle diagnosis terminals has acquired.

In addition, the display terminal establishes new wireless communication with any other terminals that are capable of performing communication therewith without repeatedly acquiring the data sets from the same terminals within the second predetermined time. This configuration allows the information sharing system to reduce needless communication between this display terminal and any other terminals, and promotes the acquisition of new diagnostic information.

DESCRIPTION OF REFERENCE NUMERALS AND SYMBOLS

Figure 1:
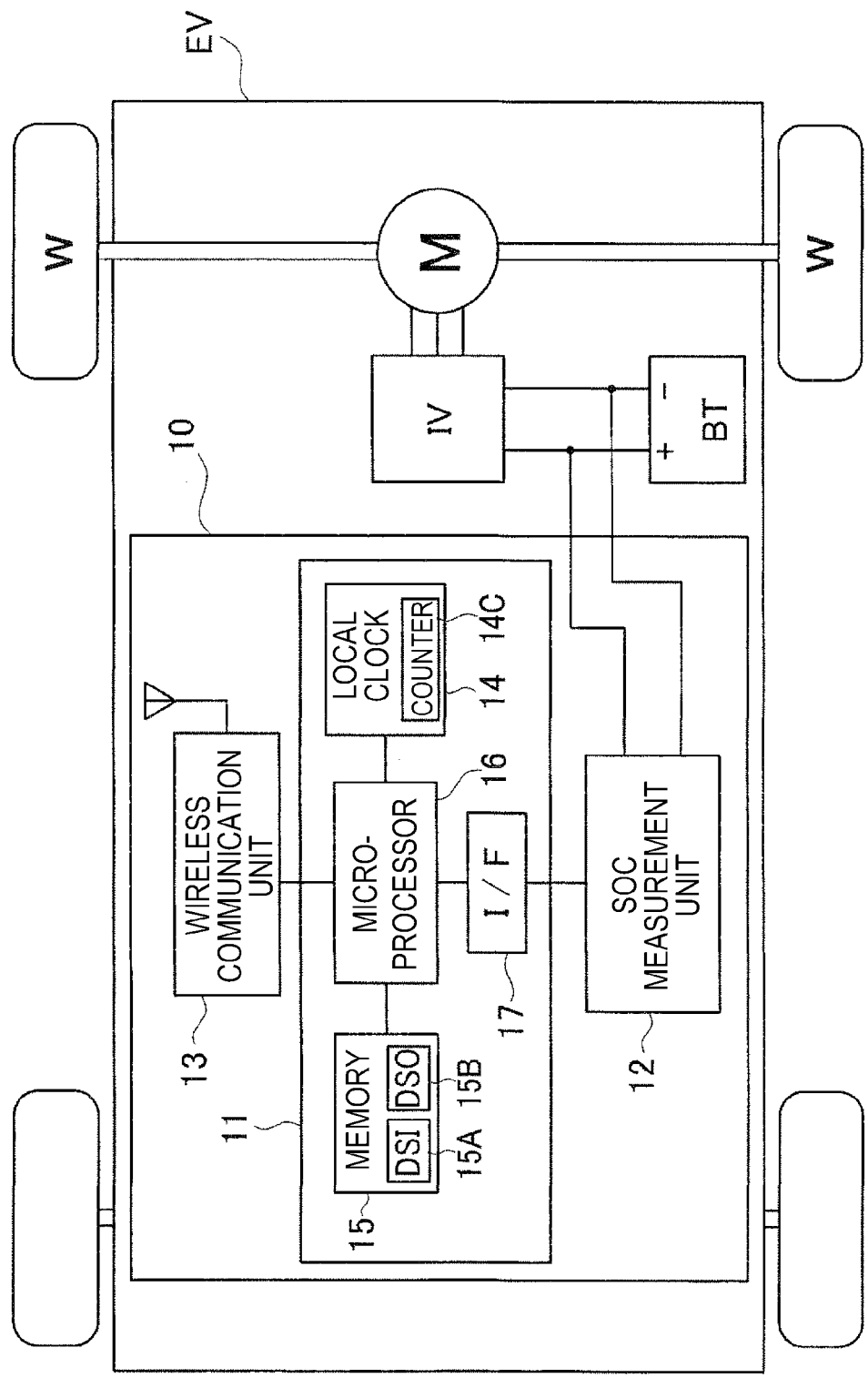
FIG. 1 is an explanatory view of a block diagram of an on-vehicle diagnosis unit according to embodiment 1, and an electric vehicle equipped with the on-vehicle diagnosis unit.

Reference numerals and symbols used to identify various features in the drawings including the following.
1 Information sharing system
EV, EVA, EVB, EVC, EVD, EVE Carts (electric vehicles)
BT Battery
10, 10A, 10B, 10C, 10D, 10E On-vehicle diagnosis units (on-vehicle diagnosis terminals, terminals)
12 SOC measurement unit (diagnostic information-acquiring unit, SOC information-acquiring unit)
13 Wireless communication unit (communication unit, first communication unit)
14 Local clock (first clock unit)
14C Counter
15 Memory
15A Own-vehicle data-storing unit
15B Other-vehicle data-storing unit
16 Microprocessor
20, 20A, 20B Tablet terminals (display terminals, terminals)
22 Liquid crystal display (display)
23 Wireless communication unit (communication unit, second communication unit)
24 Local clock (second clock unit)
24C Counter
25 Memory
25A Data-storing unit
26 Microprocessor
DS Data set
DSI Own-vehicle data set
DSO Other-vehicle data set
ID Unique identifier
CA Acquisition clock time
C1 First stored clock time
T1 First predetermined time
C2 Second stored clock time
T7 Second predetermined time
S601 to S612 First communication-establishing unit
S601 to S610 (S601 to S608) First searching unit (first communication-establishing unit)

S611 First establishing unit (first communication-establishing unit)
S601, S602 First communicable terminal list-making unit (first searching unit)
S603 to S610 (S604 to S606) First selecting unit (first searching unit)
S603 to S608 First passage list-making unit (first selecting unit)
S609, S610 First terminal selecting unit (first selecting unit)
S613, S614 Third terminal selecting unit
S608, S604 to S606 Third selecting unit
S103 First newly-storing unit
S106 First renewing-and-storing unit
S107 First clock time-storing unit
S3301 to S3312 Second communication-establishing unit
S3301 to S3310 (S3301 to S3308) Second searching unit (second communication-establishing unit)
S3311 Second establishing unit (second communication-establishing unit)
S3301, S3302 Second communicable terminal list-making unit (second searching unit)
S3303 to S3310 (S3304 to S3306) Second selecting unit (second searching unit)
S3303 to S3308 Second passage list-making unit (second selecting unit)
S3309, S3310 Second terminal selecting unit (second selecting unit)
S3313, S3314 Fourth terminal selecting unit
S3308, S3304 to S3306 Fourth selecting unit
S373 Second newly-storing unit
S376 Second renewing-and-storing unit
S377 Second clock time-storing unit

DETAILED DESCRIPTION OF THE PREFERRED EMBODIMENTS

A detailed description of preferred embodiments is given below with reference to the drawings. However, the present invention should not be construed as being limited thereto.

Embodiment 1

Figure 2:
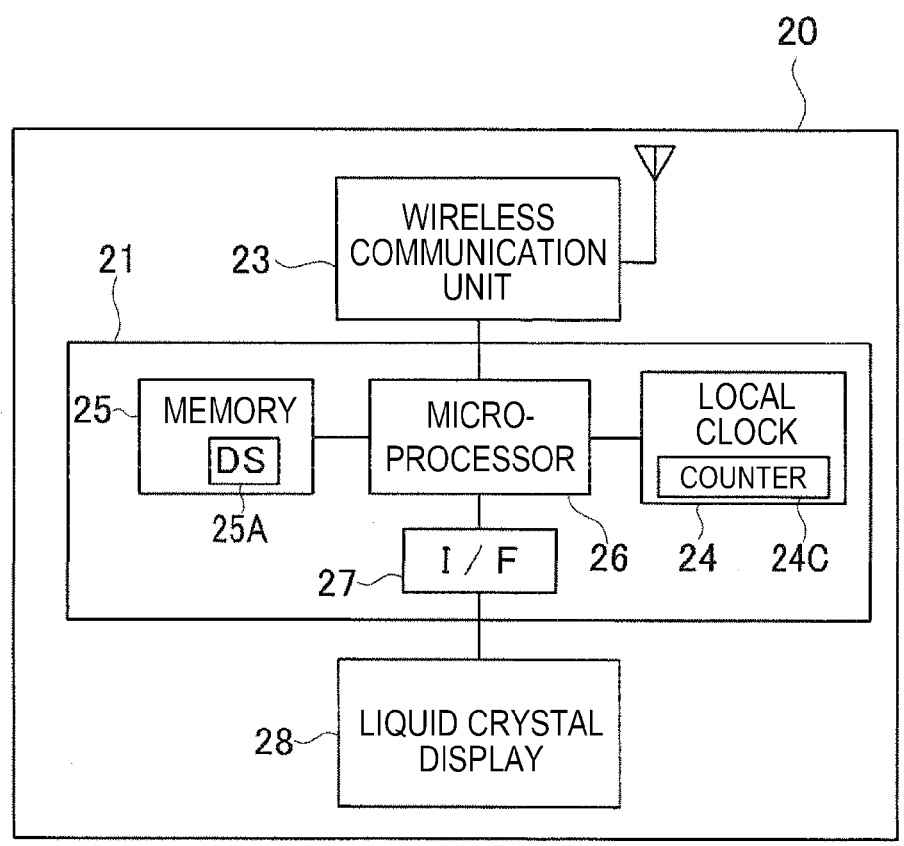
FIG. 2 is an explanatory view of a block diagram of a tablet terminal according to embodiment 1.
Figure 3:
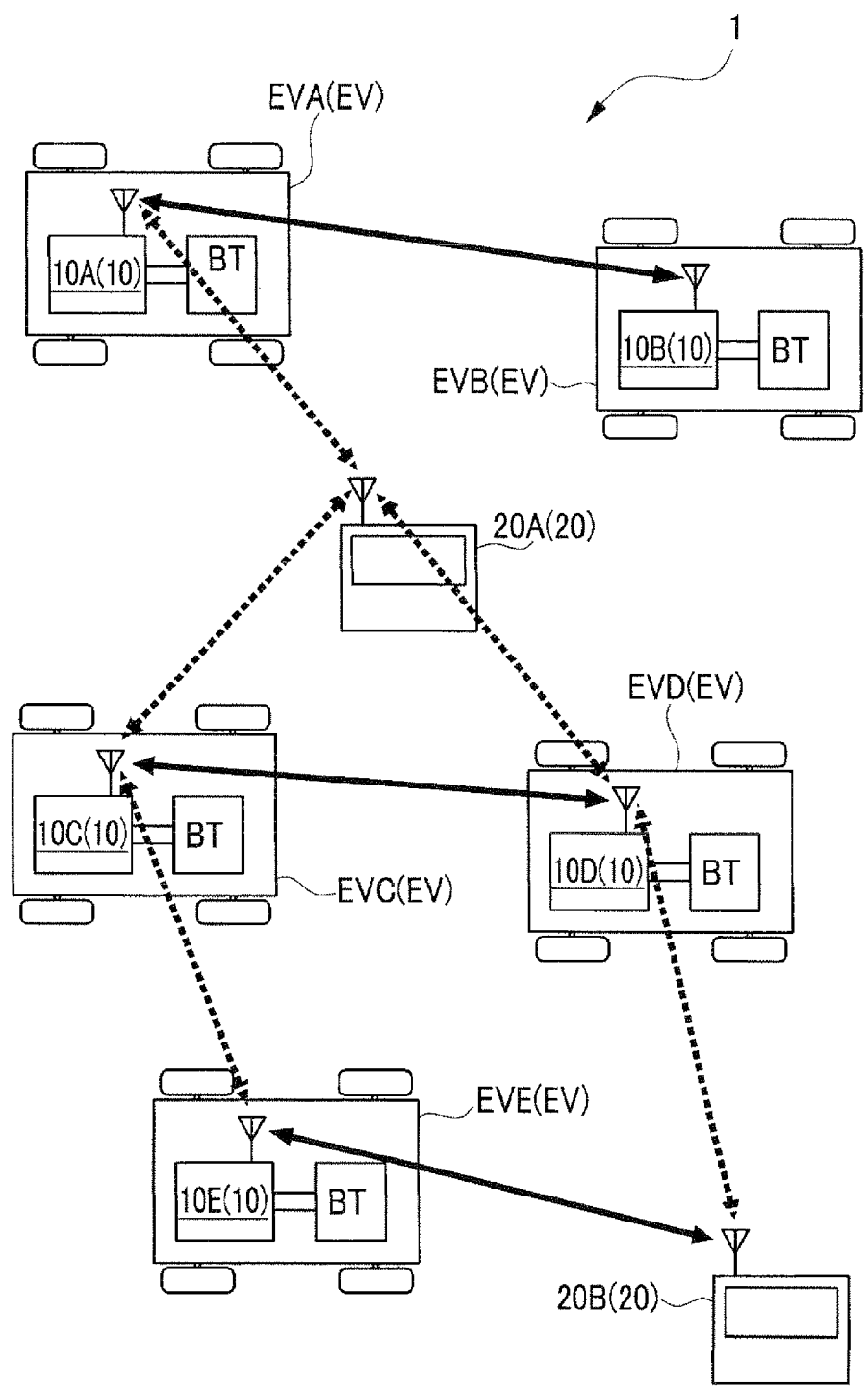
FIG. 3 is an explanatory view of a configuration of an information sharing system according to embodiment 1.

FIG. 1 is a block diagram of an on-vehicle diagnosis unit 10 that defines an on-vehicle diagnosis terminal according to present embodiment 1 and a cart EV that defines an electric vehicle equipped with the on-vehicle diagnosis unit 10. FIG. 2 is a block diagram of a tablet terminal 20 that defines a display terminal according to present embodiment 1. Shown in FIG. 3 is a block diagram of an information sharing system 1 according to present embodiment 1 including a plurality of the on-vehicle diagnosis units 10 (10A, 10B 10C, 10D, 10E) mounted respectively to a plurality of carts EV (EVA, EVB, EVC, EVD, EVE), and a plurality of tablet terminals 20 (20A, 20B). The on-vehicle diagnosis units 10 and the tablet terminals 20 are collectively referred to as the terminals 10, 20.

The carts EV (EVA, . . . ) shown in FIG. 1 and FIG. 3 define electric vehicles used on golf courses, and include an electric motor M configured to drive drive wheels W, an inverter IV configured to invert DC voltage to AC voltage, and a battery BT configured to supply electric power to the electric motor M through the inverter IV.

In addition, the on-vehicle diagnosis units 10 each mounted to the carts EV (EVA, . . . ) include a main circuit unit 11, an SOC measurement unit 12, and a wireless communication unit 13. Among these units, the main circuit units 11 include a microprocessor 16, a local clock 14 connected to a bus of the microprocessor 16, a memory 15, and an interface circuit 17 configured for connection to the SOC measurement unit 12. The wireless communication units 13 are also connected to the buses of the microprocessors 16.

The SOC measurement units 12 are connected to the batteries BT of the carts EV. The SOC measurement units 12 measure the states of charge (SOC) of the batteries BT, to be specific, open circuit voltages (OCV) of the batteries BT corresponding to the SOC, as diagnostic information on the carts EV equipped with the on-vehicle diagnosis units 10 at a constant frequency (to be specific, every three minutes) at instruction of the microprocessors 16.

In addition, each of the wireless communication units 13 defines a wireless communication module that is configured to perform peer-to-peer wireless communication with any of terminals 10, 20, being other than the on-vehicle diagnosis unit 10 (the other on-vehicle diagnosis units 10 or the tablet terminals 20), in accordance with a predetermined communication protocol (to be specific, by Wi-Fi Direct (trade name) in present embodiment 1).

In addition, the local clocks 14 include a counter 14C configured to count up at predetermined time intervals (every one second) that are unified in the information sharing system 1. The counters 14C have a count value that is acquired by starting to count from a predetermined timing that is unified in the information sharing system 1 (in all of the on-vehicle diagnosis units 10 and the tablet terminals 20). Thus, the local clocks 14 keep the count values of the counters 14C as unified local times for use in the information sharing system 1.

In addition, the on-vehicle diagnosis units 10 use unique MAC addresses of the wireless communication units 13 as the unique identifiers ID that are uniquely assigned to the on-vehicle diagnosis units 10. The on-vehicle diagnosis units 10 store data sets DS (sets of the unique identifiers ID, the diagnostic information (the measurement values of the SOC), and the acquisition clock times CA) in own-vehicle data-storing units 15A of the memories 15 as own-vehicle data sets DSI (see step S5 in FIG. 4 described below). The data sets DS contain measurement values of SOC that are diagnostic information measured at the constant frequency with the use of the SOC measurement units 12, acquisition clock times CA at local times at the timing of acquiring the measurement values (to be specific, the count values of the counters 14C of the local clocks 14 that keep the local times), and the unique identifiers ID that are MAC addresses.

In addition, the on-vehicle diagnosis units 10 obtain other-vehicle data sets DSO that define data sets DS on the carts EV equipped with any other on-vehicle diagnosis units 10 over wireless communication with any other on-vehicle diagnosis units 10 or the tablet terminals 20 performed by the wireless communication units 13, and store the other-vehicle data sets DSO in other-vehicle data-storing units 15B of the memories 15.

The own-vehicle data sets DSI and the other-vehicle data sets DSO are stored in the form of data files in the own-vehicle data-storing units 15A and the other-vehicle data-storing units 15B of the memories 15.

In addition, the tablet terminals 20 shown in FIG. 2 include a main circuit unit 21, a wireless communication unit 23, and a liquid crystal display 28. Among them, the main circuit units 21 include a microprocessor 26, a local clock 24 (including a counter 24C having a count value that keeps a local time) connected to a bus of the microprocessor 26, a memory 25, and an interface circuit 27 (e.g., LSI for display) configured for connection to the liquid crystal display 28.

The tablet terminals 20 define commercially available tablet terminals in which exclusive software for establishing the information sharing system 1 is installed. The wireless communication units 23 are configured to perform peer-to-peer wireless communication with any other terminals 10, 20 (the on-vehicle diagnosis units 10 or the other tablet terminals 20) in accordance with a predetermined communication protocol (by Wi-Fi Direct (trade name) in present embodiment 1) as is the case of the wireless communication units 13 of the on-vehicle diagnosis units 10.

In addition, the tablet terminals 20 store the data sets DS on the carts EV acquired from any other terminals 10, 20 in the form of data files in data-storing units 25A of the memories 25 over wireless communication performed by the wireless communication units 23.

In the information sharing system 1 shown in FIG. 3, the on-vehicle diagnosis units 10 (10A, 10B, . . . ) mounted respectively to the carts EV (EVA, EVB, . . . ) and the tablet terminals 20 (20A, 20B) acquire the data sets DS containing the diagnostic information on the carts EV (EVA, . . . ) from the adjacent wireless communication units 10, 20 capable of performing peer-to-peer wireless communication through the respective wireless communication units 13 and 23 to store the data sets DS in the memories 15 and 25 (the other-vehicle data-storing units 15B, and the data-storing units 25A). Then, the terminals 10, 20 in the entire system 1 repeat the acquisition of the data sets DS described above, and thus, for example, the tablet terminal 20B can acquire and share the data sets containing the diagnostic information on the units (10A, 10B) of the carts EVA and EVB that cannot perform direct wireless communication with the tablet terminal 20B. As described above, the terminals 10, 20 in the system 1 can share the data sets of themselves and any other terminals 10, 20 while renewing the data sets.

Next, a detailed description of the operation of one on-vehicle diagnosis unit 10 among the terminals 10, 20 included in the information sharing system 1 will be provided referring to FIG. 4 to FIG. 8.

Figure 4:
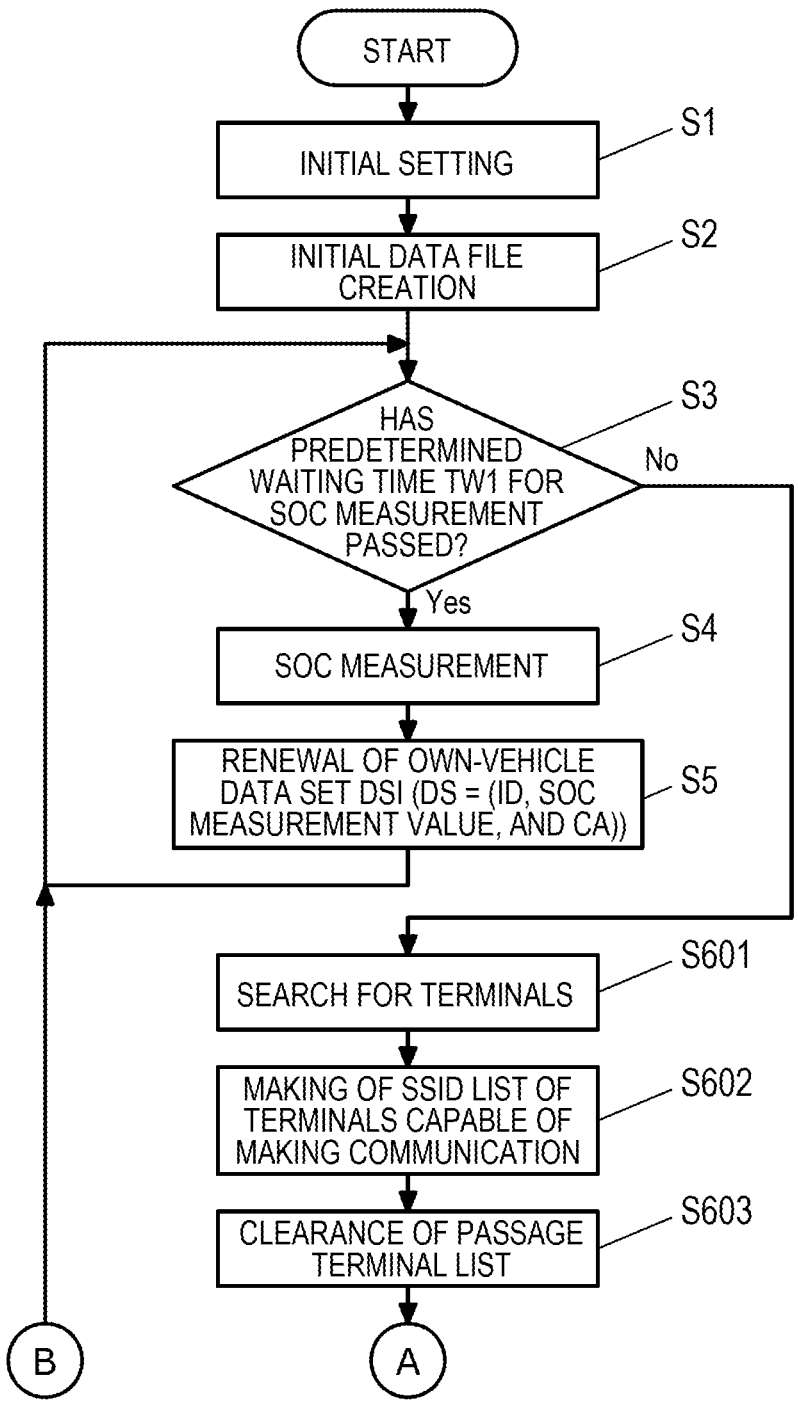
FIG. 4 is the first section of a flow chart of a processing operation of a microprocessor of an on-vehicle diagnosis unit according to embodiment 1 and modified embodiment 1.
Figure 5:
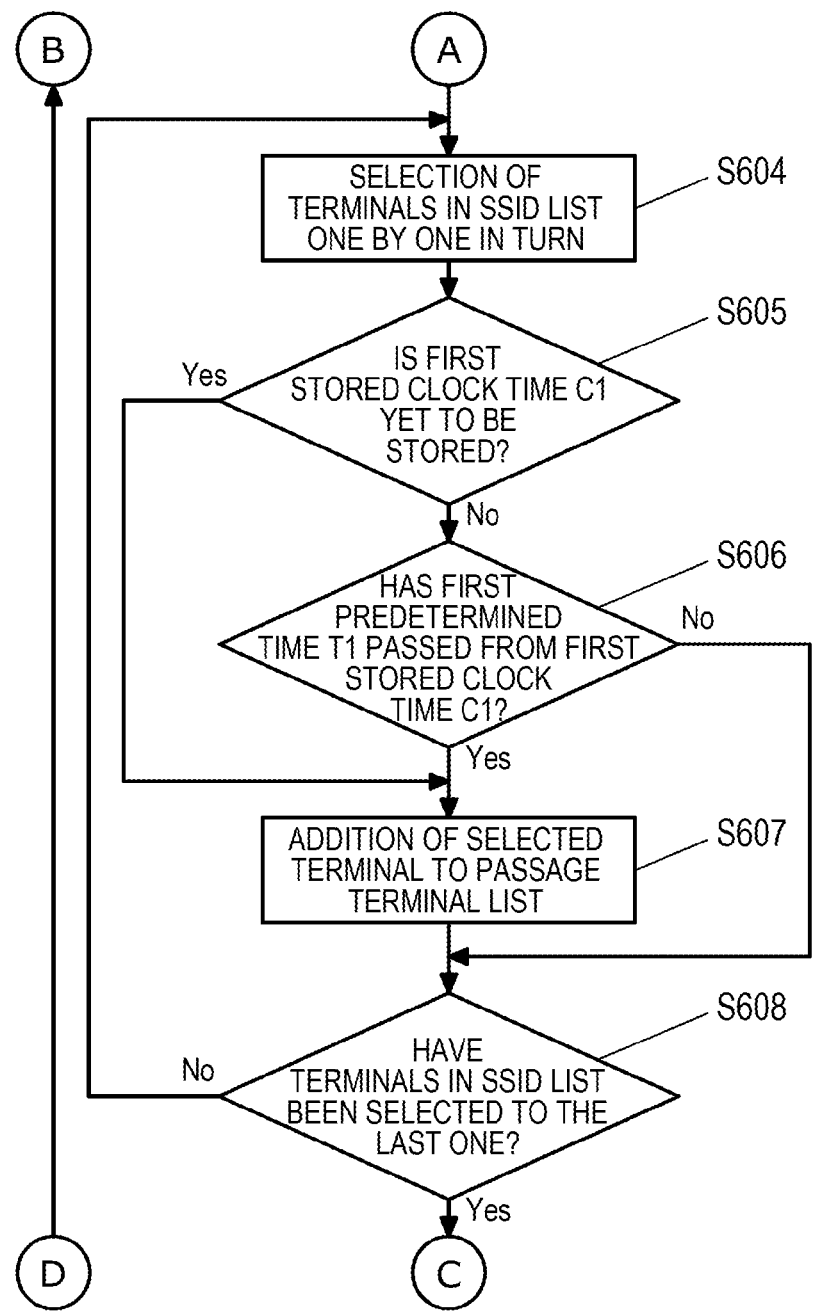
FIG. 5 is the middle section of the flow chart of the processing operation of the microprocessor of the on-vehicle diagnosis unit according to embodiment 1 and modified embodiment 1.
Figure 6:
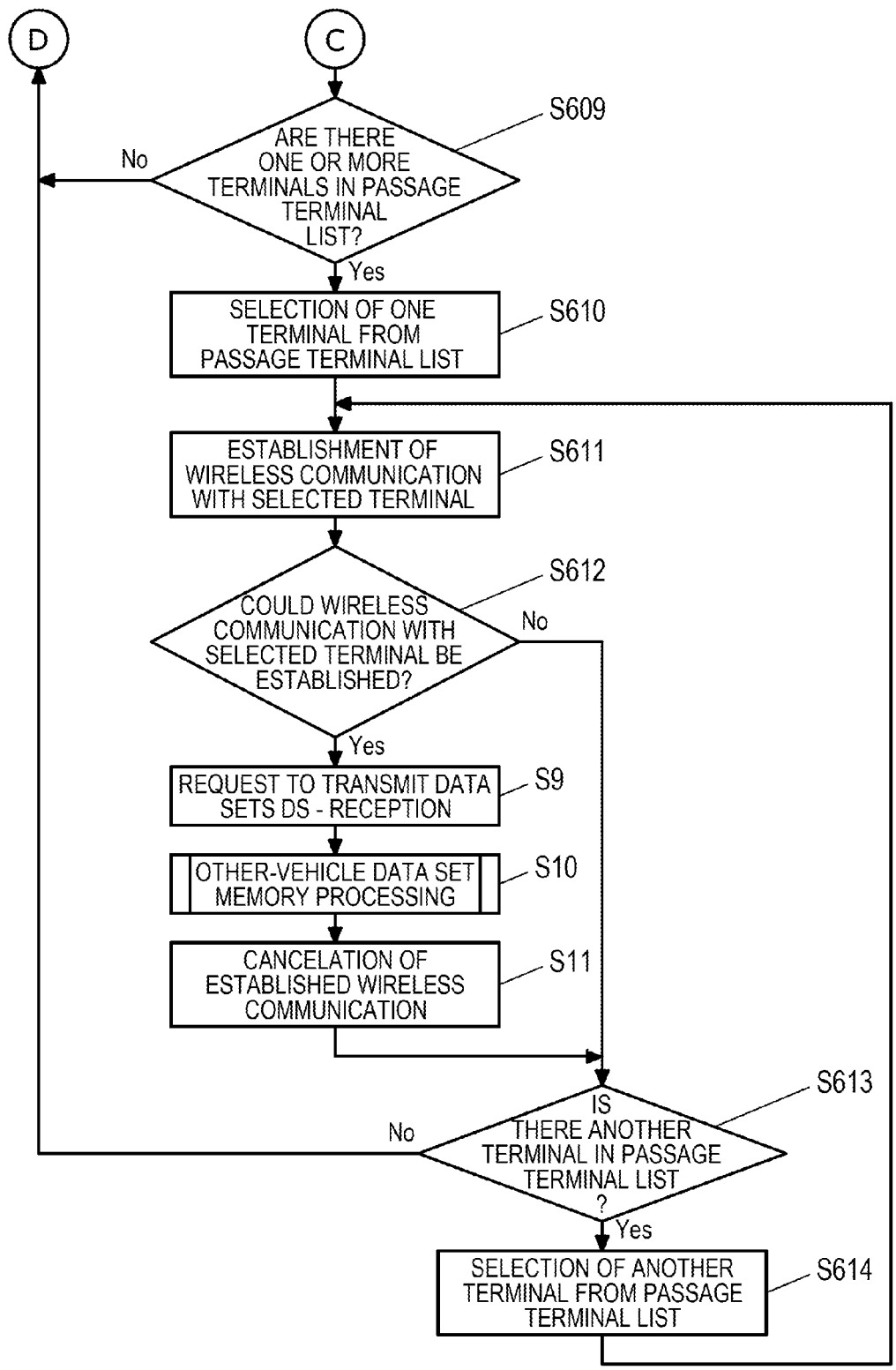
FIG. 6 is the last section of the flow chart of the processing operation of the microprocessor of the on-vehicle diagnosis unit according to embodiment 1.

FIG. 4 to FIG. 6 are a flow chart of the operation relating to data set acquisition in the microprocessor 16 of the on-vehicle diagnosis unit 10.

Upon start of the operation of the microprocessor 16, initial settings of the wireless communication unit 13 and the SOC measurement unit 12 are first made in step S1 in FIG. 4. The counter 14C of the local clock 14 that keeps the local time that is unified in the information sharing system 1 in advance counts up all the time with the use of a backup battery (not illustrated).

Then, in step S2, initial data files for storing the own-vehicle data set DSI and the other-vehicle data sets DSO are created to be stored in the memory 15 (the own-vehicle data-storing unit 15A and the other-vehicle data-storing unit 15B).

Then, in step S3, a determination is made as to whether or not a predetermined waiting time TW1 for SOC measurement (three minutes in present embodiment 1) has passed. When the predetermined waiting time TW1 has passed (Yes), the operation proceeds to step S4. When the predetermined waiting time TW1 has not passed (No), the operation proceeds to step S601.

In step S4, the state of charge (SOC) of the battery BT of the cart EV equipped with the on-vehicle diagnosis unit 10 is measured with use of the SOC measurement unit 12. Specifically, an open circuit voltage (OCV) of the battery BT is measured, and a corresponding SOC is estimated from the OCV.

Next, in step S5, the on-vehicle diagnosis unit 10 stores a data set DS in the own-vehicle data-storing unit 15A of the memory 15, the data set containing a measurement value of the acquired SOC (diagnostic information), an acquisition clock time CA at a local time at the timing of acquiring the measurement value (a count value of the counter 14C of the local clock 14), and a unique identifier ID that is a MAC address of the wireless communication 13. Then, upon completing step S5, the operation returns to step S3. Thus, the SOC measurement of the battery BT is performed at a constant frequency (=three minutes in the embodiment).

However, when the operation proceeds to step S601 in the case of No in step S3, the on-vehicle diagnosis unit 10 searches for the presence or absence of wireless communication units 13, 23 of any other terminals 10, 20 (the other on-vehicle diagnosis units 10 or the tablet terminals 20) that are capable of performing wireless communication with the wireless communication unit 13 of the on-vehicle diagnosis unit 10.

Next, in step S602, the on-vehicle diagnosis unit 10 makes an SSID list that is a listing of service set identifiers (hereinafter, referred to also as the SSIDs) in relation to the wireless communication units 13, 23 of the terminals 10, 20 capable of performing wireless communication that are found by the search.

In the following step S603, a passage terminal list that is made in the following steps S604 to S608 in FIG. 5 is cleared prior to making the passage terminal list.

Next, the operation proceeds to step S604 in FIG. 5, and the on-vehicle diagnosis unit 10 selects one of the terminals 10, 20 in the SSID list made in step S602. In making the passage terminal list by repeatedly performing steps S604 to S608, the on-vehicle diagnosis unit 10 selects the terminals 10, 20 in the SSID list one by one in turn in step S604.

Next, in the following step S605, the on-vehicle diagnosis unit 10 checks the first stored clock time C1 stored in relation to each terminal 10, 20 selected in step S604.

Figure 7:
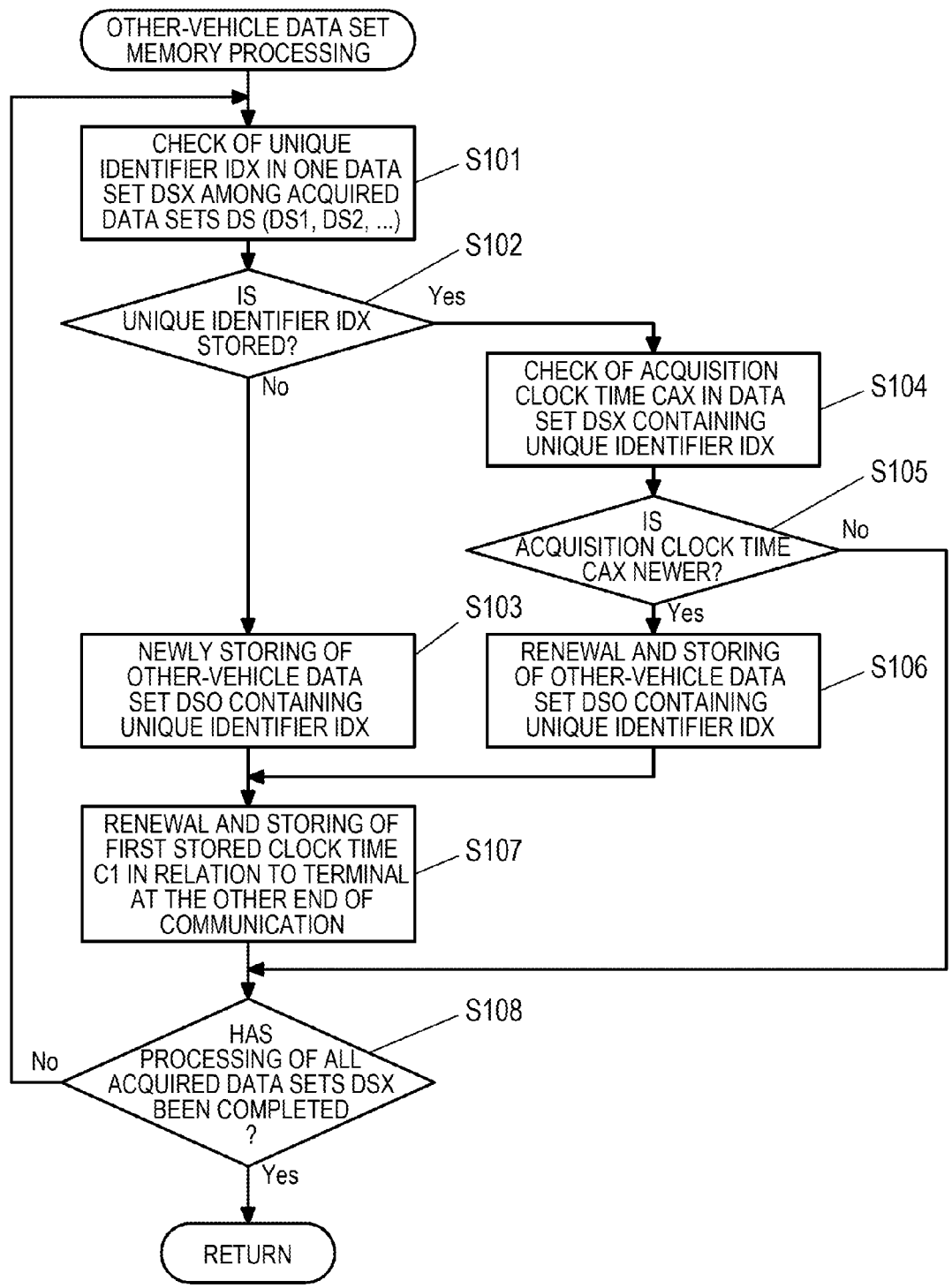
FIG. 7 is a flow chart of an other-vehicle data set memory processing routine performed by the on-vehicle diagnosis unit according to embodiment 1.

The first stored clock time C1 defines a local time that is renewed and stored as the first stored clock time C1 for every terminal 10, 20 at the other end, where every time the data sets DS, stored in each terminal 10, 20 at the other end of the wireless communication established with the wireless communication unit 13 of the on-vehicle diagnosis unit 10 (each first terminal), are stored in the other-vehicle data-storing unit 15B of the on-vehicle diagnosis unit 10, the local time is renewed and stored at this time of storage (see step S107 in FIG. 7 described below).

When a first stored clock time C1 has not yet been stored in step S605, specifically, when the data sets DS have not been acquired in the past from the selected terminal 10, 20 (Yes), the operation proceeds to step S607. Then, in step S607, the on-vehicle diagnosis unit 10 adds the terminal 10, 20 selected in step S604 to the passage terminal list, and the operation proceeds to step S608.

However, when the first stored clock time C1 is stored in step S605 (No), the operation proceeds to step S606.

In step S606, the on-vehicle diagnosis unit 10 determines whether or not the local time at this point has passed a first predetermined time T1 (T1=five minutes in present embodiment 1) from the first stored clock time C1. When the first predetermined time T1 or more has passed from the first stored clock time C1 in step S606 (Yes), the operation proceeds to step S607 as is the case where Yes is selected in step S605, and the on-vehicle diagnosis unit 10 adds the terminal 10, 20 selected in step S604 to the passage terminal list. Then, the operation proceeds to step S608.

However, when the first predetermined time T1 has not passed in step S606 (No), the operation skips step S607, and proceeds to step S608.

In step S608, the on-vehicle diagnosis unit 10 checks whether or not the terminals 10, 20 in the SSID list have all been selected. When the terminals 10, 20 in the SSID list have not all been selected (No), the operation returns to step S604, and the operations of steps S604 to S608 are repeated to continue to make the passage terminal list. However, when the terminals 10, 20 in the SSID list have all been selected (Yes), the making of the passage terminal list is completed, and the operation proceeds to step S609 in FIG. 6.

In step S609, the on-vehicle diagnosis unit 10 determines the presence or absence of one or more terminals 10, 20 in the passage terminal list of which the making has been completed after Yes has been selected in step S608. When there is not another terminal 10, 20 in the passage terminal list (No), the operation returns to step S3 in FIG. 4. Then, the operations of step S3 and the subsequent steps are repeated again. Specifically, in step S601, the on-vehicle diagnosis unit 10 again searches for a terminal 10, 20 capable of performing wireless communication therewith to make an SSID list in step S602.

However, when there are one or more terminals 10, 20 in the passage terminal list in step S609 (Yes), the operation proceeds to step S610.

In step S610, the on-vehicle diagnosis unit 10 selects one given terminal 10, 20 from the passage ten final list. Next, in step S611, the on-vehicle diagnosis unit 10 establishes wireless communication with the terminal 10, 20 selected in step S610.

In the following step S612, the on-vehicle diagnosis unit 10 checks whether or not wireless communication could be established with the selected terminal 10, 20. In this step, when the wireless communication could be established (Yes), the operation proceeds to step S9, while when the wireless communication could not be established (No), the operation proceeds to step S613.

In step S9, a request to transmit data sets DS and reception thereof is made with the terminal 10, 20 at the other end with which the wireless communication is established.

Figure 8:
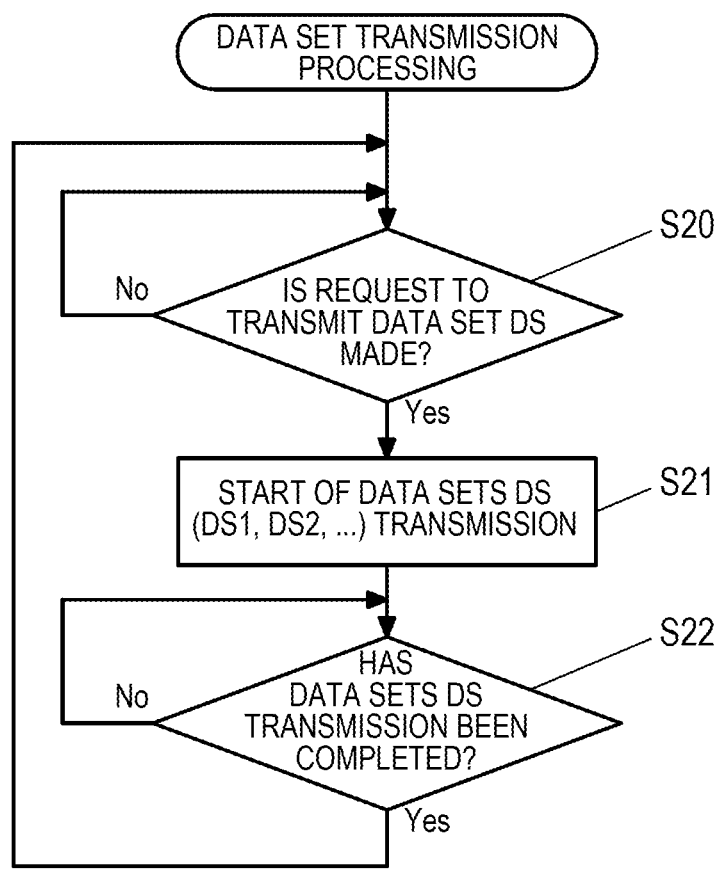
FIG. 8 is a flow chart of a data set transmission processing routine performed by a terminal at the other end of wireless communication.

At this moment, the terminal 10, 20 at the other end of the wireless communication performs a data set transmission processing routine shown in FIG. 8, and waits for the request to transmit the data sets DS to arrive over wireless communication from the present on-vehicle diagnosis unit 10 with which the wireless communication is established in step S20. Then, upon receiving the request to transmit the data sets DS, Yes is selected in step S20 and the operation proceeds to step S21. Then, the terminal 10, 20 begins transmission of the data sets DS stored in the memories 15 and 25 (the own-vehicle data-storing unit 15A, the other-vehicle data-storing unit 15B, and the data-storing unit 25A) over wireless communication toward the present on-vehicle diagnosis unit 10 with which wireless communication is established. Then, the terminal 10, 20 waits for transmission of the data sets DS to complete in step S22 (No). When transmission is completed (Yes), the operation returns to step S20, and the terminal 10, 20 waits for a request to again transmit data sets DS.

The data sets DS thus acquired from the terminal 10, 20 at the other end of wireless communication in step S9 contain the data sets DS (e.g., DS1, DS2, . . . ) on the plurality of carts EV (e.g., EVA, EVB, . . . ) equipped with the on-vehicle diagnosis units 10 (e.g., 10A, 10B, . . . ).

Next, the operation proceeds to step S10, and an other-vehicle data set memory processing routine shown in FIG. 7 is performed. Then, upon completing the other-vehicle data set memory processing routine, the operation proceeds to step S11.

The established wireless communication is canceled in step S11, and then the operation proceeds to step S613.

In step S613, the on-vehicle diagnosis unit 10 determines the presence or absence of another terminal 10, 20, with which wireless communication has not yet been established, in the previously-made passage terminal list. When there is another terminal 10, 20 in the passage terminal list (Yes), the operation proceeds to step S614. Then, the on-vehicle diagnosis unit 10 selects one terminal 10, 20 in the list. Next, the operation returns to step S611, and the on-vehicle diagnosis unit 10 establishes wireless communication with the terminal 10, 20 selected in step S614.

However, when there is not another terminal 10, 20 in the passage terminal list in step S613 (No), the operation returns to step S3 in FIG. 4. Then, the operations of step S3 and the subsequent steps are repeated again.

As described above, in establishing wireless communication, the on-vehicle diagnosis unit 10 according to present embodiment 1 first makes the SSID list. Besides this, the on-vehicle diagnosis unit 10 further makes the passage terminal list of the terminals 10, 20 selected from the terminals 10, 20 in the SSID list, the selected terminals 10, 20 not yet having the first stored clock times C1 stored, or the first stored clock times C1 that are stored and from which the first predetermined time T1 or more has passed. Then, the on-vehicle diagnosis unit 10 selects one terminal 10, 20 from the passage terminal list, and establishes wireless communication with the terminal 10, 20.

Specifically, if the terminal 10, 20 with which wireless communication is intended to be established is the terminal 10, 20 at the other end from which the data sets DS have been acquired within the first predetermined time T1 (=five minutes), the possibility that new diagnostic information (SOC measurement values) is contained in the data sets DS is low because the elapsed time from the latest acquisition of the data sets DS is short. Thus, the on-vehicle diagnosis unit 10 is configured not to perform inclusion of the terminals 10, 20 having the data sets DS that have already been acquired, in the passage terminal list, and not to establish wireless communication with the terminals 10, 20 until the first predetermined time T1 passes.

Thus, the on-vehicle diagnosis unit 10 does not establish wireless communication with the same terminals 10, 20 within the first predetermined time T1, which can reduce needless communication. In addition, not establishing needless communication as described above can increase the chances of communicating with different terminals 10, 20, which can promote sharing of the data sets DS.

Next, a description of the other-vehicle data set memory processing routine in step S10 will be provided with reference to FIG. 7.

First, in step S101, a unique identifier IDx in one data set DSx is checked among the data sets DS (DS1, DS2, . . . ) that are acquired from the terminal 10, 20 at the other end in step S9 in FIG. 6. Then, in the following step S102, the on-vehicle diagnosis unit 10 determines whether or not the unique identifier IDx is contained in the data sets DS stored in the other-vehicle data-storing unit 15B of the on-vehicle diagnosis unit 10, that is, whether or not the unique identifier IDx is stored in the other-vehicle data-storing unit 15B.

When the unique identifier IDx is not stored in the other-vehicle data-storing unit 15B (No), the operation proceeds to step S103, and the data set DSx containing the unique identifier IDx is newly stored as an other-vehicle data set DSO in the other-vehicle data-storing unit 15B. Then, the operation proceeds to step S107.

However, when the unique identifier IDx is stored in the other-vehicle data-storing unit 15B (Yes), the operation proceeds to step S104, and an acquisition clock time CAx in the data set DSx containing the unique identifier IDx is checked. Further, in the following step S105, the on-vehicle diagnosis unit 10 determines whether or not the acquisition clock time CAx is newer than the acquisition clock time CA in the data set DS stored in the other-vehicle data-storing unit 15B of the on-vehicle diagnosis unit 10. That is, the on-vehicle diagnosis unit 10 determines whether or not the acquired data set DSx is newer than the data set DS that the on-vehicle diagnosis unit 10 stores. Specifically, the on-vehicle diagnosis unit 10 compares the sizes of the counter values of the acquisition clock time CAx and the acquisition clock time CA.

When the acquisition clock time CAx is newer (CAx>CA: Yes), the operation proceeds to step S106, and the data set DSx containing the unique identifier IDx is renewed and stored as the other-vehicle data set DSO in the other-vehicle data-storing unit 15B. Then, the operation proceeds to step S107. In step S107, a local time at this point, which is a timing at which the other-vehicle data set DSO is stored in the other-vehicle data-storing unit 15B, is renewed and stored as the first stored clock time C1 in relation to the terminal 10, 20 at the other end of the communication (the first terminal) for every terminal 10, 20. Then, the operation proceeds to step S108.

In addition, when the acquisition clock time CAx is not newer (CAx≤CA: No) in step S105, neither renewal of the other-vehicle data set DSO in step S106 nor renewal of the first stored clock time C1 in step S107 is performed, and the operation proceeds to step S108.

In step S108, the on-vehicle diagnosis unit 10 determines whether or not processing of all the acquired data sets DSx has been completed. When the processing has not been completed (No), the operation returns to step S101, and the operations of step S101 to step S108 are repeated until processing of all the acquired data sets DSx is completed. Then, when the processing of all the acquired data sets DSx is completed (Yes), the other-vehicle data set memory processing routine is completed, and the operation proceeds to step S11 in FIG. 6.

Then, this processing is performed in each of the on-vehicle diagnosis units 10 (10A, 10B, . . . ), and thereby the SOC measurement values (diagnostic information) in relation to the on-vehicle diagnosis units 10 (10A, 10B, . . . ) are shared in the information sharing system 1.

Figure 9:
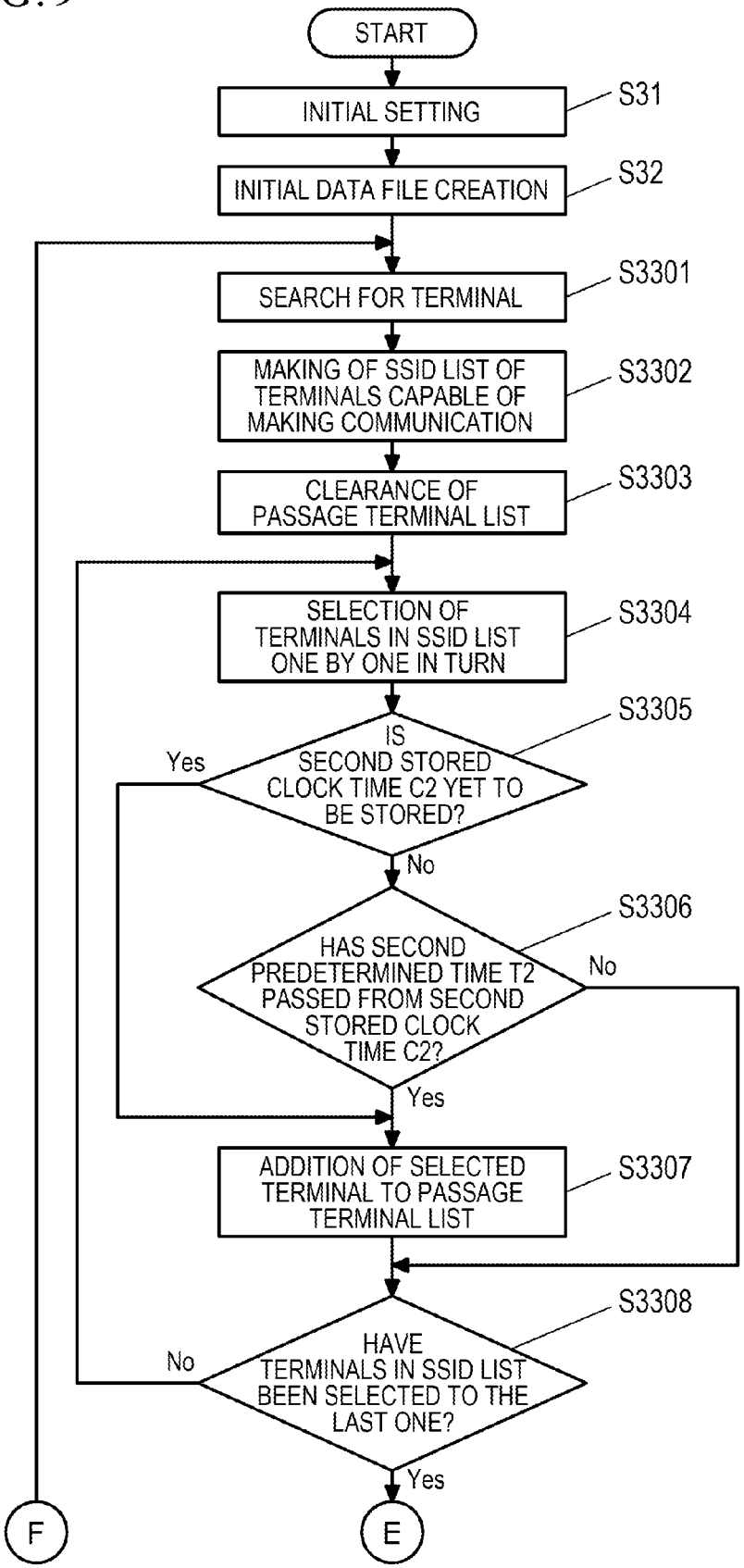
FIG. 9 is the first section of a flow chart of a processing operation of a microprocessor of a tablet terminal according to embodiment 1 and modified embodiment 1.
Figure 10:
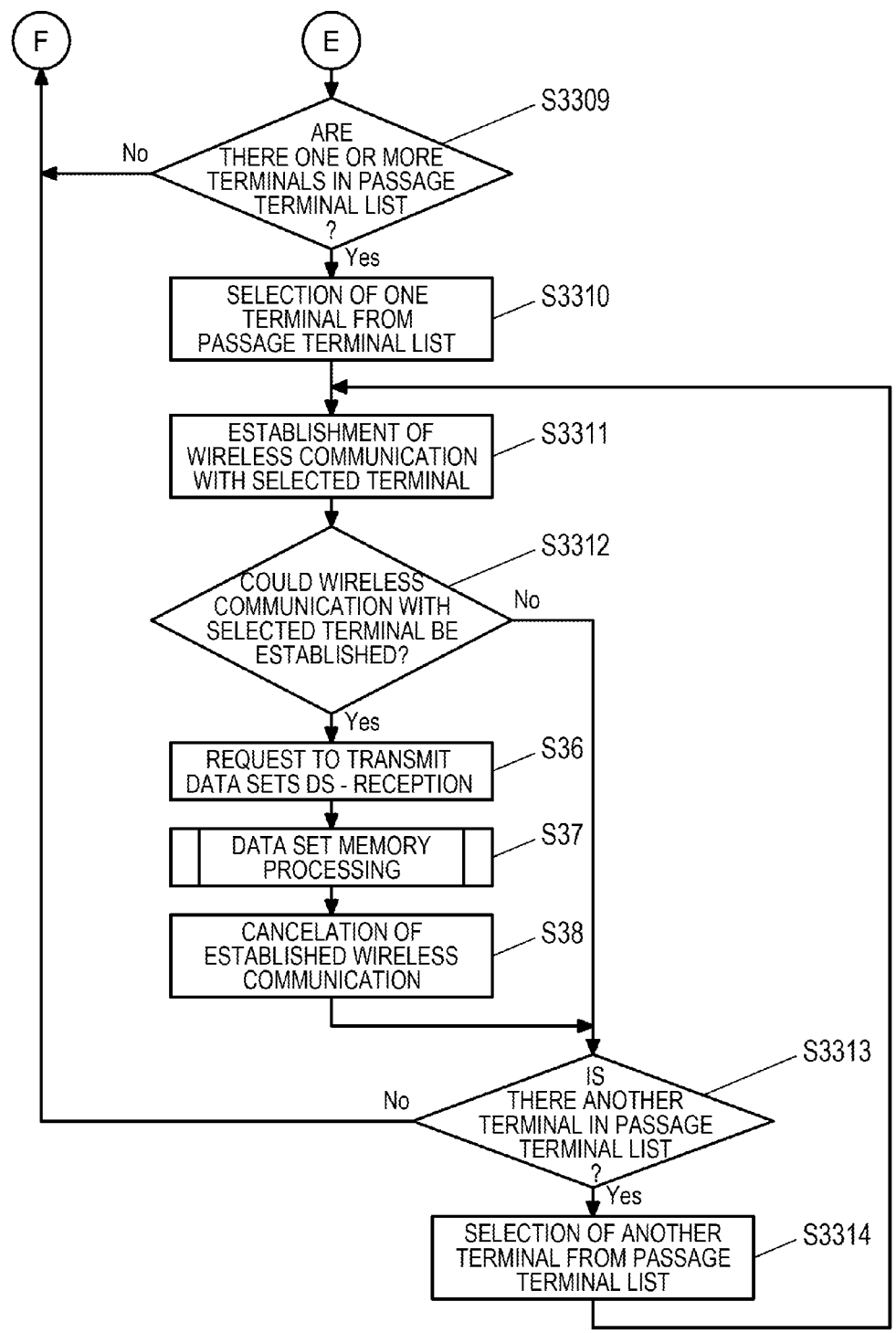
FIG. 10 is the last section of the flow chart of the processing operation of the microprocessor of the tablet terminal according to embodiment 1.
Figure 11:
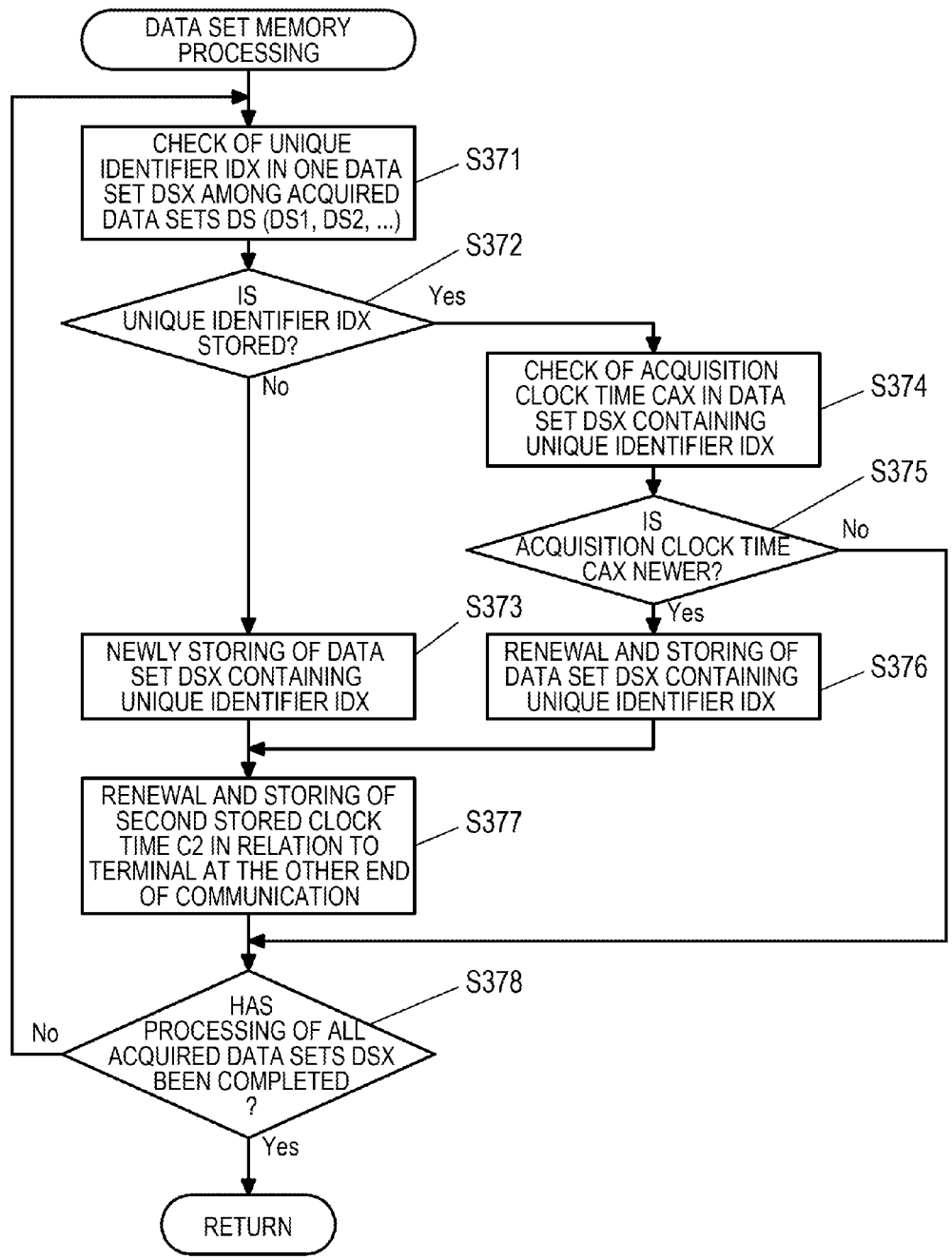
FIG. 11 is a flow chart of a data set memory processing routine performed by the tablet terminal according to embodiment 1.

Next, a detailed description of the operation of one tablet terminal 20 among the terminals 10, 20 included in the information sharing system 1 will be provided with reference to FIG. 9 to FIG. 11. FIG. 9 and FIG. 10 illustrate a flow chart of data set acquisition in the microprocessor 26 of the tablet terminal 20.

Upon start of the operation of the microprocessor 26, an initial setting of the wireless communication unit 23 is first made in step S31 in FIG. 9. The counter 24C of the local clock 24 that keeps the local time that is unified in the information sharing system 1 in advance counts up all the time with the use of a backup battery (not illustrated).

Then, in step S32, an initial data file for storing data sets DS is created to be stored in the memory 25 (the data-storing unit 25A).

Further, in step S3301, the tablet terminal 20 searches the presence or absence of wireless communication units 13, 23 of any other terminals 10, 20 (the on-vehicle diagnosis units 10 or the other tablet terminals 20) that are capable of performing wireless communication with the wireless communication unit 23 of the tablet terminal 20. Next, in step S3302, the tablet terminal 20 makes an SSID list that is a listing of SSIDs in relation to the wireless communication units 13, 23 of the terminals 10, 20 capable of performing wireless communication that are found by the search. In the following step S3303, a passage terminal list that is made in the following steps S3304 to S3308 is cleared prior to making the list.

First, in step S3304, the tablet terminal 20 selects one of the terminals 10, 20 in the SSID list made in step S3302. In making the passage terminal list by repeatedly performing steps S3304 to S3308, the tablet terminal 20 selects the terminals 10, 20 in the SSID list one by one in turn in step S3304.

Next, in the following step S3305, the tablet terminal 20 checks the stored second clock time C2 stored in relation to each terminal 10, 20 selected in step S3304.

As is the case of the first stored clock time C1 of the on-vehicle diagnosis unit 10, the second stored clock time C2 of the tablet terminal 20 defines a local time that is renewed and stored as the second stored clock time C2 for every terminal 10, 20 at the other end, where every time the data sets DS stored in each terminal 10, 20 at the other end of the wireless communication established with the wireless communication unit 23 of the tablet terminal 20 (each second terminal) are stored in the data-storing unit 25A of the tablet terminal 20, the local time is renewed and stored at this time of storage (see step S377 in FIG. 11 described below).

When a second stored clock time C2 has not yet been stored in step S3305, specifically, when the data sets DS have not been acquired in the past from the selected terminal 10, 20 (Yes), the operation proceeds to step S3307. Then, in step S3307, the tablet terminal 20 adds the terminal 10, 20 selected in step S3304 to the passage terminal list, and the operation proceeds to step S3308.

However, when the second stored clock time C2 is stored in step S3305 (No), the operation proceeds to step S3306.

In step S3306, the tablet terminal 20 determines whether or not the local time at this point has passed a second predetermined time T2 (T2=five minutes in present embodiment 1) from the second stored clock time C2. Then, when the second predetermined time T2 or more has passed from the second stored clock time C2 in step S3306 (Yes), the operation proceeds to step S3307 as is the case where Yes is selected in step S3305, and the tablet terminal 20 adds the terminal 10, 20 selected in step S3304 to the passage terminal list. Then, the operation proceeds to step S3308.

However, when the second predetermined time T2 has not passed in step S3306 (No), the operation skips step S3307, and proceeds to step S3308.

In step S3308, the tablet terminal 20 checks whether or not the terminals 10, 20 in the SSID list have all been selected. When the terminals 10, 20 in the SSID list have not all been selected (No), the operation returns to step S3304, and the operations of steps S3304 to S3308 are repeated to continue to make the passage terminal list. However, when the terminals 10, 20 in the SSID list have all been selected (Yes), the making of the passage terminal list is completed, and the operation proceeds to step S3309 in FIG. 10.

In step S3309, the tablet terminal 20 determines the presence or absence of one or more terminals 10, 20 in the passage terminal list, the making of which has been completed after Yes has been selected in step S3308. When there is no terminal 10, 20 in the passage terminal list (No), the operation returns to step S3301 in FIG. 9. Then, the operations of step S3301 and the subsequent steps are repeated again. Specifically, in step S3301, the tablet terminal 20 again searches a terminal 10, 20 capable of performing wireless communication therewith to make an SSID list in step S3302.

However, when there are one or more terminals 10, 20 in the passage terminal list in step S3309 (Yes), the operation proceeds to step S3310.

In step S3310, the tablet terminal 20 selects one given terminal 10, 20 from the passage terminal list. Next, in step S3311, the tablet terminal 20 establishes wireless communication with the terminal 10, 20 selected in step S3310.

In the following step S3312, the tablet terminal 20 checks whether or not wireless communication could be established with the selected terminal 10, 20. In this step, when wireless communication could be established (Yes), the operation proceeds to step S36, while when wireless communication could not be established (No), the operation proceeds to step S3313.

In step S36, a request to transmit data sets DS and reception thereof are made with the terminal 10, 20 at the other end of the established wireless communication.

At this moment, the terminal 10, 20 at the other end of wireless communication performs a data set transmission processing routine shown in FIG. 8 as described above.

Then, the data sets DS acquired from the terminal 10, 20 at the other end of wireless communication in step S36 contain the data sets DS (e.g., DS1, DS2, . . . ) on the plurality of carts EV (e.g., EVA, EVB, . . . ) equipped with the on-vehicle diagnosis units 10 (e.g., 10A, 10B, . . . ).

Next, the operation proceeds to step S37, and the tablet terminal 20 performs a data set memory processing routine shown in FIG. 11. Then, upon completing the data set memory processing routine, the operation proceeds to step S38.

The established wireless communication is canceled in step S38, and then the operation proceeds to step S3313.

In step S3313, the tablet terminal 20 determines the presence or absence of another terminal 10, 20, with which wireless communication has not yet been established, in the previously-made passage terminal list. When there is another terminal 10, 20 in the passage terminal list (Yes), the operation proceeds to step S3314. Then, the tablet terminal 20 selects one terminal 10, 20 in the list. Next, the operation returns to step S3311, and the tablet terminal 20 establishes wireless communication with the terminal 10, 20 selected in step S3314.

However, when there is not another terminal 10, 20 in the passage terminal list in step S3313 (No), the operation returns to step S3301 in FIG. 9. Then, the operations of step S3301 and subsequent steps are repeated again.

As described above, in establishing wireless communication, the tablet terminal 20 according to present embodiment 1 first makes the SSID list as is the case of the on-vehicle diagnosis unit 10. Besides this, the tablet terminal 20 further makes the passage terminal list of the terminals 10, 20 selected from the terminals 10, 20 in the SSID list, the selected terminals 10, 20 not yet having the second stored clock times C2 stored, or the second stored clock times C2 that are stored and from which the second predetermined time T2 or more has passed. Then, the on-vehicle diagnosis unit 10 selects one terminal 10, 20 from the passage terminal list, and establishes wireless communication with the terminal 10, 20.

Specifically, if the terminal 10, 20 with which wireless communication is intended to be established is the terminal 10, 20 at the other end from which the data sets DS have been acquired within the second predetermined time T2 (=five minutes), the possibility that new diagnostic information (SOC measurement values) is contained in the data sets DS is low. This is because the elapsed time from the latest acquisition of the data sets DS is short. Thus, the tablet terminal 20 is configured not to include the terminals 10, 20 having data sets DS that have already been acquired, in the passage terminal list, and not to establish wireless communication with the terminals 10, 20 until the second predetermined time T2 passes.

Thus, the tablet terminal 20 does not establish wireless communication with the same terminals 10, 20 within the second predetermined time T2, which can reduce needless communication. In addition, not establishing needless communication as described above can increase the chances of performing communication with different terminals 10, 20, which can promote sharing of the data sets DS.

Next, a description of a data set memory processing routine in step S37 will be provided with reference to FIG. 11. This data set memory processing routine is approximately the same as the other-vehicle data set memory processing routine performed by the microprocessor 16 of the on-vehicle diagnosis unit 10 shown in FIG. 7.

First, in step S371, a unique identifier IDx in one data set DSx is checked among the data sets DS (DS1, DS2, . . . ) that are acquired from the terminal 10, 20 at the other end in step S36 in FIG. 10. Then, in the following step S372, the tablet terminal 20 determines whether or not the unique identifier IDx is contained in the data sets DS stored in the data-storing unit 25A of the tablet terminal 20, that is, whether or not the unique identifier IDx is stored in the data-storing unit 25A.

When the unique identifier IDx is not stored in the data-storing unit 25A (No), the operation proceeds to step S373, and the data set DSx containing the unique identifier IDx is newly stored in the data-storing unit 25A. Then, the operation proceeds to step S377.

However, when the unique identifier IDx is stored in the data-storing unit 25A (Yes), the operation proceeds to step S374, and an acquisition clock time CAx in the data set DSx containing the unique identifier IDx is checked. Further, in the following step S375, the tablet terminal 20 determines whether or not the acquisition clock time CAx is newer than the acquisition clock time CA in the data set DS stored in the data-storing unit 25A of the tablet terminal 20. That is, the on-vehicle diagnosis unit 10 determines whether or not the acquired data set DSx is newer than the data set DS that the on-vehicle diagnosis unit 10 stores. Specifically, the on-vehicle diagnosis unit 10 compares the sizes of the counter values of the acquisition clock time CAx and the acquisition clock time CA.

When the acquisition clock time CAx is newer (CAx>CA: Yes), the operation proceeds to step S376, and the data set DSx containing the unique identifier IDx is renewed and stored in the data-storing unit 25A. Then, the operation proceeds to step S377. In step S377, a local time at this point, which is a timing at which the data set DSx is stored in the data-storing unit 25A, is renewed and stored as the second stored clock time C2 in relation to the terminal 10, 20 at the other end of the communication (the second terminal) for every terminal 10, 20. Then, the operation proceeds to step S378.

In addition, in step S375, when the acquisition clock time CAx is not newer (CAx≤CA: No), neither renewal of the data set DSx in step S376 nor renewal of the second stored clock time C2 in step S377 is performed, and the operation proceeds to step S378.

In step S378, the tablet terminal 20 determines whether or not processing of all the acquired data sets DSx has been completed. When the processing has not been completed (No), the operation returns to step S371, and the operations of step S371 to step S378 are repeated until processing of all the acquired data sets DSx is completed. Then, when the processing of all the acquired data sets DSx is completed (Yes), the data set memory processing routine is completed, and the operation proceeds to step S38 in FIG. 10.

Then, this processing is performed in each of the tablet terminals 20 (20A, 20B), and thereby the SOC measurement values (diagnostic information) of the on-vehicle diagnosis units 10 are also shared by the tablet terminals 20. Further, the tablet terminals 20 display the acquired diagnostic information on the carts EV on the liquid crystal displays 28 of the tablet terminals 20. Thus, it is possible to check the SOC of the batteries BT of the carts EV with use of the tablet terminals 20, and thereby the carts EV can be controlled.

The on-vehicle diagnosis units 10 correspond to the on-vehicle diagnosis terminals in present embodiment 1. In the on-vehicle diagnosis units 10, the SOC measurement units 12 correspond to the diagnostic information-acquiring units and the SOC information-acquiring units of the present invention. The wireless communication units 13 correspond to the communication units and the first communication units of the present invention. Further, the local clocks 14 including the counters 14C correspond to the first clock units of the present invention.

In addition, the tablet terminals 20 correspond to the display terminals. Among them, the liquid crystal displays 28 correspond to the displays, and the wireless communication units 23 correspond to the communication units and the second communication units. Further, the local clocks 24 including the counters 24C correspond to the second clock units.

In addition, in the on-vehicle diagnosis units 10, the microprocessors 16 that perform steps S601 to S612 correspond to the first communication-establishing units. Among these microprocessors 16, the microprocessors 16 that perform steps S601 to S610 correspond to the first searching units, and the microprocessors 16 that perform step S611 correspond to the first establishing units. Further, the microprocessors 16 that perform step S103 correspond to the first newly-storing units. The microprocessors 16 that perform step S106 correspond to the first renewing-and-storing units. The microprocessors 16 that perform step S107 correspond to the first clock time-storing units.

Further, among steps S601 to S610 (the first searching units), the microprocessors 16 that perform steps S601 and S602 correspond to the first communicable terminal list-making units, and the microprocessors 16 that perform steps S603 to S610 correspond to the first selecting units. In addition, the SSID lists made in step S602 correspond to the first communicable terminal lists, and the terminals 10, 20 in the SSID lists correspond to the first communicable terminals.

Further, among steps S603 to S610 (the first selecting units), the microprocessors 16 that perform steps S603 to S608 correspond to the first passage list-making units, and the microprocessors 16 that perform steps S609 and S610 correspond to the first terminal selecting units. In addition, the passage terminal lists made in steps S603 to S608 correspond to the first passage terminal lists, and the terminals 10, 20 selected from the passage terminal lists in step S610 correspond to the first planned-connection terminals.

Further, the microprocessors 16 that perform steps S613 and S614 correspond to the third terminal selecting units, and the terminals 10, 20 selected in step S614 correspond to the first planned-connection terminals.

In addition, in the tablet terminals 20, the microprocessors 26 that perform steps S3301 to S3312 correspond to the second communication-establishing units. Among these microprocessors 26, the microprocessors 26 that perform steps S3301 to S3310 correspond to the second searching units, and the microprocessors 26 that perform step S3311 correspond to the second establishing units. Further, the microprocessors 26 that perform step S373 correspond to the second newly-storing units. The microprocessors 26 that perform step S376 correspond to the second renewing-and-storing units. The microprocessors 26 that perform step S377 correspond to the second clock time-storing units.

Further, among steps S3301 to S3310 (the second searching units), the microprocessors 26 that perform steps S3301 and S3302 correspond to the second communicable terminal list-making units, and the microprocessors 26 that perform steps S3303 to S3310 correspond to the second selecting units. In addition, the SSID lists made in step S3302 correspond to the second communicable terminal lists, and the terminals 10, 20 in the SSID lists correspond to the second communicable terminals.

Further, among steps S3303 to S3310 (the second selecting units), the microprocessors 26 that perform steps S3303 to S3308 correspond to the second passage list-making units, and the microprocessors 26 that perform steps S3309 and S3310 correspond to the second terminal selecting units. In addition, the passage terminal lists made in steps S3303 to S3308 correspond to the second passage terminal lists, and the terminals 10, 20 selected from the passage terminal lists in step S3310 correspond to the second planned-connection terminals.

Further, the microprocessors 26 that perform steps S3313 and S3314 correspond to the fourth terminal selecting units, and the terminals 10, 20 selected in step S3314 correspond to the second planned-connection terminals.

As described above, the information sharing system 1 according to present embodiment 1 defines a system in which the on-vehicle diagnosis units 10 (10A, 10B, . . . ) and the tablet terminals 20 (20A, 20B) share the diagnostic information (SOC measurement values) on the plurality of carts EV (EVA EV B, . . . ) over wireless communication among the terminals 10, 20 using the wireless communication units 13, 23.

The on-vehicle diagnosis units 10 sequentially replace the other-vehicle data sets DSO stored in the other-vehicle data-storing units 15B of the on-vehicle diagnosis units 10 with the new data sets DS stored in any other terminals 10, 20 (the terminals other than the on-vehicle diagnosis units 10) over wireless communication. In addition, the tablet terminals 20 sequentially replace the data sets DS stored in the data-storing units 25A with the new data sets DS stored in any other terminals 10, 20 (the terminals other than the tablet terminals 20). Thus, the terminals 10, 20 can directly or indirectly acquire the data sets DS containing the diagnostic information that the on-vehicle diagnosis units 10 have acquired, the data sets DS containing the diagnostic information of the terminals 10, 20 with which direct wireless communication cannot be made but the data set being shared via any other terminals 10, 20. This configuration makes up the information sharing system 1 that shares the diagnostic information on the carts EV over communication among the terminals 10, 20.

In addition, the tablet terminals 20 can display the diagnostic information on the on-vehicle diagnosis units 10 on the liquid crystal displays 28 (the displays).

In addition, in the information sharing system 1, in establishing wireless communication, each of the on-vehicle diagnosis terminals 10 searches the terminal 10, 20 that is capable of establishing wireless communication and does not yet have a first stored clock time C1, or the first stored clock time C1 that is stored and from which the first predetermined time T1 has passed until the local time at this point (the first planned-connection terminal) (the first searching unit: steps S601 to S610). Then, each of the on-vehicle diagnosis terminals 10 establishes wireless communication with this terminal 10, 20 (the first planned-connection terminal) (the first establishing unit: step S611).

In addition, each of the tablet terminals 20 searches the terminal 10, 20 that is capable of establishing wireless communication and does not yet have a second stored clock time C2, or the second stored clock time C2 that is stored and from which the second predetermined time T2 has passed until the local time at this point (the second planned-connection terminal) (the second searching unit: steps S3301 to S3310). Then, each of the tablet terminals 20 establishes wireless communication with this terminal 10, 20 (the second planned-connection terminal) (the second establishing unit: step S3311).

Thus, in the information sharing system 1 according to present embodiment 1, the on-vehicle diagnosis terminals 10 and the tablet terminals 20 do not establish wireless communication with the same terminals 10, 20 within the first predetermined time T1 and the second predetermined time T2, which can reduce needless communication among the terminals 10, 20. This configuration can increase the chances of performing communication with different terminals 10, 20, which can promote sharing of the data sets in an early stage.

In addition, in the information sharing system 1 according to present embodiment 1, each of the on-vehicle diagnosis terminals 10 first makes the SSID list of the terminals 10, 20 capable of performing wireless communication therewith (the first communicable terminals) (the first communicable terminal list) in steps S601 and S602 (with the use of the first communicable terminal list-making unit). Thus, when establishing wireless communication with the first planned-connection terminal in step S611 (with the use of the first establishing unit), each of the on-vehicle diagnosis terminals 10 can select an appropriate terminal 10, 20 (a first communicable terminal) as the first planned-connection terminal to perform establishment processing.

In addition, in a similar manner, each of the tablet terminals 20 first makes the SSID list of the communicable terminals 10, 20 (the second communicable terminals) (the second communicable terminal list) in steps S3301 and S3302 (with the use of the second communicable terminal list-making unit). Thus, when establishing wireless communication with the second planned-connection terminal in step S3311 (with the use of the second establishing unit), each of the tablet terminals 20 can select an appropriate terminal 10, 20 (a second communicable terminal) as the second planned-connection terminal to perform establishment processing.

In addition, in the information sharing system 1 according to present embodiment 1, each of the on-vehicle diagnosis terminals 10 makes the passage terminal list (the first passage terminal list) from the SSID list (the first communicable terminal list). The terminals 10, 20 included in the made passage terminal list (the first passage terminals) define the terminals 10, 20 that are capable of performing wireless communication (the first communicable terminals) and does not yet have a first stored clock times C1, or the first stored clock times C1 that are stored and from which the first predetermined time T1 has passed until the local time at this point. Thus, any of the first passage terminals in the passage terminal list can be selected to establish wireless communication with as-is, as the first planned-connection terminal, so that the first planned-connection terminal can be easily selected.

In addition, each of the tablet terminals 20 makes the passage terminal list (the second passage terminal list) from the SSID list (the second communicable terminal list). The terminals 10, 20 included in the made passage terminal list (the second passage terminals) define the terminals 10, 20 that are capable of performing wireless communication (the second communicable terminals) and does not yet have second stored clock times C2, or the second stored clock times C2 that are stored and from which the second predetermined time T2 has passed until the local time at this point. Thus, any of the second passage terminals in the passage terminal list can be selected to have wireless communication established with as-is, as the second planned-connection terminal, so that the second planned-connection terminal can be easily selected.

In addition, in the information sharing system 1 according to present embodiment 1, when wireless communication could not be established with the terminal 10, 20 (the first planned-connection terminal) selected from the passage terminal list (the first passage terminal list) (when No is selected in step S612), each of the on-vehicle diagnosis terminals 10 again selects another terminal 10, 20 (another first planned-connection terminal) from the passage terminal list with use of the third selecting unit (in steps S613 and S614).

In addition, in a similar manner, when wireless communication could not be established with the terminal 10, 20 selected from the passage terminal list (the second planned-connection terminal) (the second passage terminal list) (when No is selected in step S3312), each of the tablet terminals 20 again selects another terminal 10, 20 (another second planned-connection terminal) from the passage terminal list with use of the fourth selecting unit (in steps S3313 and S3314).

Thus, in the information sharing system 1 according to present embodiment 1, wireless communication with the first planned-connection terminals and the second planned-connection terminals can easily be established.

In addition, in the information sharing system 1 according to present embodiment 1, also in the case where wireless communication could be established in step S611 (with the use of the first establishing unit) (when Yes is selected in step S612), each of the on-vehicle diagnosis terminals 10 then cancels the wireless communication established in step S11, and then selects another terminal 10, 20 (another first planned-connection terminal) from the passage terminal list (the first passage terminal list) with use of the third selecting unit (in steps S613 and S614).

In addition, in the information sharing system 1 according to present embodiment 1, also in the case where wireless communication could be established in step S3311 (with the use of the second establishing unit) (when Yes is selected in step S3312), each of the tablet terminals 20 then cancels the wireless communication established in step S38, and then selects another terminal 10, 20 (another second planned-connection terminal) from the passage terminal list (the second passage terminal list) with use of the fourth selecting unit (in steps S3313 and S3314).

Thus, in the information sharing system 1 according to present embodiment 1, the first planned-connection terminals and the second planned-connection terminals are effectively selected with use of the passage terminal lists, and wireless communication can be established.

Further, the information sharing system 1 according to present embodiment 1 includes the plurality of tablet terminals 20. The second communication-establishing units (steps S3301 to S3312) of the plurality of tablet terminals 20 can establish wireless communication not only with the wireless communication units 13 (the first communication units) of the on-vehicle diagnosis units 10, but also with the wireless communication units 23 (the second communication units) of any other tablet terminals 20 as the communication units of the terminals 10, 20 that are capable of performing wireless communication with the wireless communication units 23 of the tablet terminals 20.

This configuration allows the tablet terminals 20 to acquire the data sets DS stored in any other tablet terminals 20, so that the information on the data sets DS can easily migrate from the terminals 10, 20 including the tablet terminals 20 to any other terminals 10, 20, and thereby promote data sharing.

Further, in the information sharing system 1 according to present embodiment 1, the SOC measurement units 12 (the SOC information-acquiring units) of the on-vehicle diagnosis units 10 diagnose the states of charge (SOC) of the batteries BT mounted to the carts EV via diagnostic information. This configuration allows the controller of the carts EV to properly control the states of charge (SOC) of the carts EV by charging the batteries BT before the carts EV become incapable of running, or by changing the carts EV for carts EV which are charged.

Further, in the information sharing system 1 according to present embodiment 1, the local clocks 14 (the first clock units) and the local clocks 24 (the second clock units) keep the local times that are used only in the information sharing system 1 as the common time that is unified in the information sharing system 1. Thus, the system 1 can be made not to depend on a remote clock such as a GPS satellite or on a clock time acquired by Internet connection when setting the common time. In addition, this configuration allows the system 1 to be used indoors or outdoors.

Modified Embodiment 1

Next, a description of a modified embodiment (a first modified embodiment) of above-described embodiment 1 will be provided with reference to the flow charts of FIG. 4, FIG. 5, FIG. 9, FIG. 12, and FIG. 13. Present modified embodiment 1 has the same processing operations in each step as those of embodiment 1, while a part of the flow of the processing operation of the microprocessors 16 of the on-vehicle diagnosis units 10 and a part of the flow of the processing operation of the microprocessors 26 of the tablet terminals 20 are different from those of embodiment 1. For this reason, explanations of the operation in the steps are omitted or simplified, while mainly descriptions of parts different from embodiment 1 are provided hereinafter.

Figure 12:
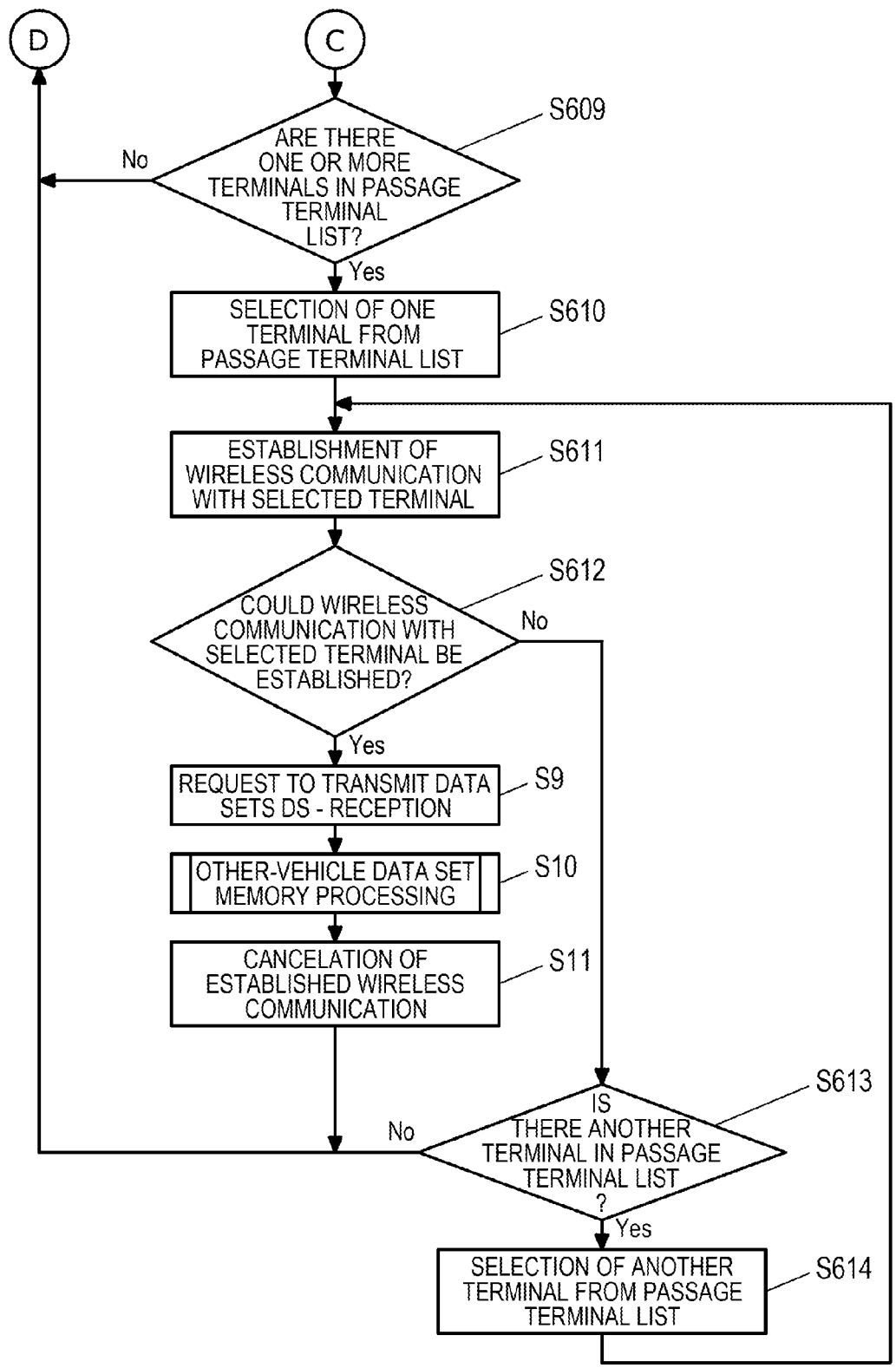
FIG. 12 is the last section of the flow chart of the processing operation of the microprocessor of the on-vehicle diagnosis unit according to modified embodiment 1.

FIG. 4, FIG. 5, and FIG. 12 illustrate a flow chart relating to data set acquisition in the microprocessor 16 of one on-vehicle diagnosis unit 10 according to present modified embodiment 1. Among them, FIG. 4 and FIG. 5 are the same as embodiment 1. In FIG. 12, the same step numbers as those in the flow chart of FIG. 6 are employed where the same processing as in embodiment 1 is performed.

In the on-vehicle diagnosis unit 10 according to present modified embodiment 1, upon start of the operation of the microprocessor 16, the SOC measurement is performed in steps S3 to S5, and the SSID list and the passage terminal list are made in steps S601 to S608 as is the case of embodiment 1 (see FIG. 4 and FIG. 5). Next, the operation proceeds to step S609 in FIG. 12, and the on-vehicle diagnosis unit 10 determines the presence or absence of one or more terminals 10, 20 in the passage terminal list, the making of which has been completed. Then, when there are one or more terminals 10, 20 in the passage terminal list in this step S609 (Yes), the operation proceeds to step S610. When there is no terminal 10, 20 in the passage terminal list in step S609 (No), the operation returns to step S3 in FIG. 4.

In step S610, the on-vehicle diagnosis unit 10 selects one given terminal 10, 20 from the passage terminal list. In the following step S611, the on-vehicle diagnosis unit 10 establishes wireless communication with the terminal 10, 20 selected in step S610.

Next, in the following step S612, the on-vehicle diagnosis unit 10 checks whether or not the wireless communication could be established with the selected terminal 10, 20. When wireless communication could not be established (No), the operation proceeds to step S613, and the on-vehicle diagnosis unit 10 determines the presence or absence of another terminal 10, 20 in the passage terminal list. When there is another terminal 10, 20 in the passage terminal list in step S613 (Yes), the operation proceeds to step S614. When there is not another terminal 10, 20 in the passage terminal list in step S613 (No), the operation returns to step S3 in FIG. 4. The processing operation until here is exactly the same as the processing operation performed by the on-vehicle diagnosis units 10 according to embodiment 1.

However, when the wireless communication could be established in step S612 (Yes), the operation proceeds to step S9 as is the case of embodiment 1. Then, the on-vehicle diagnosis unit 10 performs a request to transmit data sets DS and reception thereof, and then performs an other-vehicle data set memory processing routine in step S10. Further, in the following step S11, the established wireless communication is canceled. However, after step S11 the operation returns directly to step S3 without proceeding to step S613 unlike embodiment 1.

Specifically, in the on-vehicle diagnosis unit 10 according to present modified embodiment 1, when wireless communication could not be established in step S612 (No), the operation proceeds to step S613, and the on-vehicle diagnosis unit 10 determines the presence or absence of another terminal 10, 20 in the passage terminal list as is the case of embodiment 1. Then, when there are other terminals 10, 20 (Yes), the on-vehicle diagnosis unit 10 selects one terminal 10, 20 among them in step S614. Then, the operation returns to step S611, and the on-vehicle diagnosis terminal 10 establishes new wireless communication. However, when wireless communication could be established in step S612 (Yes), the data sets DS are received and stored. Then, unlike embodiment 1, the operation returns to step S3, and the on-vehicle diagnosis unit 10 again searches terminals 10, 20 capable of performing wireless communication therewith in step S601 to make a new SSID list in step S602.

Figure 13:
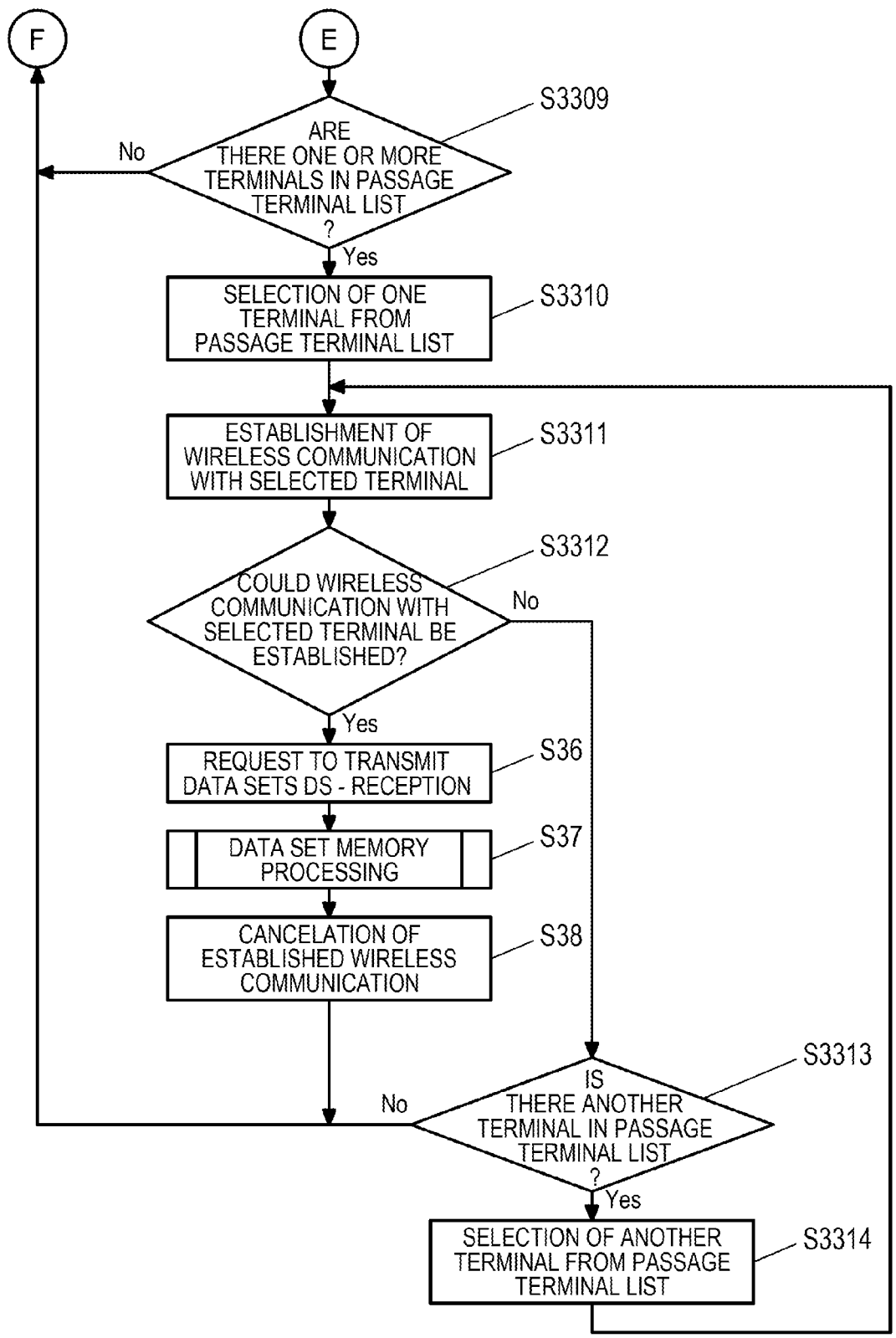
FIG. 13 is the last section of the flow chart of the processing operation of the microprocessor of the tablet terminal according to modified embodiment 1.

In addition, FIG. 9 and FIG. 13 are a flow chart relating to data set acquisition in the microprocessor 26 of one tablet terminal 20 according to present modified embodiment 1. Among them, FIG. 9 is the same as embodiment 1. In FIG. 13, the same step numbers as those in the flow chart of FIG. 10 are employed where the same processing as in embodiment 1 is performed.

Also in the tablet terminal 20 according to present modified embodiment 1 like in the on-vehicle diagnosis unit 10, upon start of the operation of the microprocessor 26, the SSID list and the passage terminal list are made in steps S3301 to S3308 as is the case of embodiment 1 (see FIG. 9). Next, the operation proceeds to step S3309 in FIG. 13, and the on-vehicle diagnosis unit 10 determines the presence or absence of one or more terminals 10, 20 in the passage terminal list, the making of which has been completed. Then, when there are one or more terminals 10, 20 in the passage terminal list in step S3309 (Yes), the operation proceeds to step S3310. When there is no terminal 10, 20 in the passage terminal list (No), the operation returns to step S3301 in FIG. 9.

In step S3310, the tablet terminal 20 selects one given terminal 10, 20 from the passage terminal list. In the following step S3311, the tablet terminal 20 establishes wireless communication with the terminal 10, 20 selected in step S3310.

Next, in step S3312, the tablet terminal 20 checks whether or not the wireless communication could be established with the selected terminal 10, 20. When wireless communication could not be established (No), the operation proceeds to step S3313, and the tablet terminal 20 determines the presence or absence of another terminal 10, 20 in the passage terminal list. When there is another terminal 10, 20 in the passage terminal list in step S3313 (Yes), the operation proceeds to step S3314. When there is not another terminal 10, 20 in the passage terminal list (No), the operation returns to step S3301 in FIG. 9. The processing operation until here is exactly the same as the processing operation performed by the tablet terminals 20 according to embodiment 1 as is the case of the on-vehicle diagnosis units 10.

However, when wireless communication could be established in step S3312 (Yes), the operation proceeds to step S36 as in the case of embodiment 1. Then, the tablet terminal 20 performs a request to transmit and receive data sets DS, and then performs a data set memory processing routine in step S37. Further, in the following step S38, the established wireless communication is canceled. However, after step S38, the operation returns directly to step S3301 without proceeding to step S3313 unlike embodiment 1.

Specifically, in the tablet terminal 20 according to present modified embodiment 1, when wireless communication could not be established in step S3312 (No), the operation proceeds to step S3313, and the tablet terminal 20 determines the presence or absence of another terminal 10, 20 in the passage terminal list as is the case of embodiment 1. Then, when there are other terminals 10, 20 (Yes), the tablet terminal 20 selects one terminal 10, 20 among them in step S3314. Then, the operation returns to step S3310, and the tablet terminal 20 establishes new wireless communication. However, when wireless communication could be established in step S3312 (Yes), the data sets DS are received and stored. Then, unlike embodiment 1, the operation returns to step S3301, and the tablet terminal 20 searches again terminals 10, 20 capable of performing wireless communication therewith to make a new SSID list in step S3302.

Thus, also in the information sharing system 1 according to present modified embodiment 1, each of the on-vehicle diagnosis units 10 makes the SSID list and the passage terminal list, and when wireless communication could not be established with the terminal 10, 20 selected from the passage terminal list (the first planned-connection terminal) (when No is selected in step S612), the on-vehicle diagnosis unit 10 again selects another terminal 10, 20 from the passage terminal list with use of the third selecting unit (in steps S613 and S614) as is the case of embodiment 1.

In addition, in a similar manner, each of the tablet terminals 20 makes the SSID list and the passage terminal list, and when wireless communication could not be established with the terminal 10, 20 selected from the passage terminal list (the second planned-connection terminal) (when No is selected in step S3312), each of the tablet terminals 20 again selects another terminal 10, 20 (another second planned-connection terminal) from the passage terminal list with use of the fourth selecting unit (in steps S3313 and S3314).

Thus, also in the information sharing system 1 according to present modified embodiment 1, wireless communication with the first planned-connection terminals and the second planned-connection terminals can be easily established, and the same working effects as embodiment 1 are realized.

However, in the information sharing system 1 according to present modified embodiment 1, unlike embodiment 1, in the case where wireless communication could be established in step S611 (with the use of the first establishing unit) (when Yes is selected in step S612), each of the on-vehicle diagnosis terminals 10 then cancels the wireless communication established in step S11. Then, the operation returns to step S3, and each of the on-vehicle diagnosis terminals 10 makes a new SSID list and passage terminal list. In addition, in a similar manner, in the case where wireless communication could be established in step S3311 (with the use of the second establishing unit) (when Yes is selected in step S3312), each of the tablet terminals 20 then cancels the wireless communication established in step S38. Then, the operation returns to step S3301, and each of the tablet terminals 20 makes a new SSID list and passage terminal list.

Thus, in present modified embodiment 1, after storing in the other-vehicle data-storing units 15B and storing in the data-storing units 25A are performed, new SSID and passage terminal lists are made, and diagnostic information acquisition is achieved based on the newer lists.

Embodiment 2

Next, a description of a second embodiment of the present invention will be provided with reference to the flow charts of FIG. 14 to FIG. 18. While the entire configuration and the like of the information sharing system 1 according to present embodiment 2 are the same as those of the information sharing system 1 according to embodiment 1 shown in FIG. 1 to FIG. 3, a part of the processing operation of the microprocessors 16 of the on-vehicle diagnosis units 10 and a part of the processing operation of the microprocessors 26 of the tablet terminals 20 are different from embodiment 1. Thus, explanations of parts similar to embodiment 1 are omitted or simplified. Detailed descriptions of the operation of the on-vehicle diagnosis units 10 and the operation of the tablet terminals 20 included in the information sharing system 1 according to present embodiment 2 will be provided while mainly explaining these aspects different from embodiment 1.

First, a detailed description of the operation of one on-vehicle diagnosis unit 10 according to present embodiment 2 will be provided.

Figure 14:
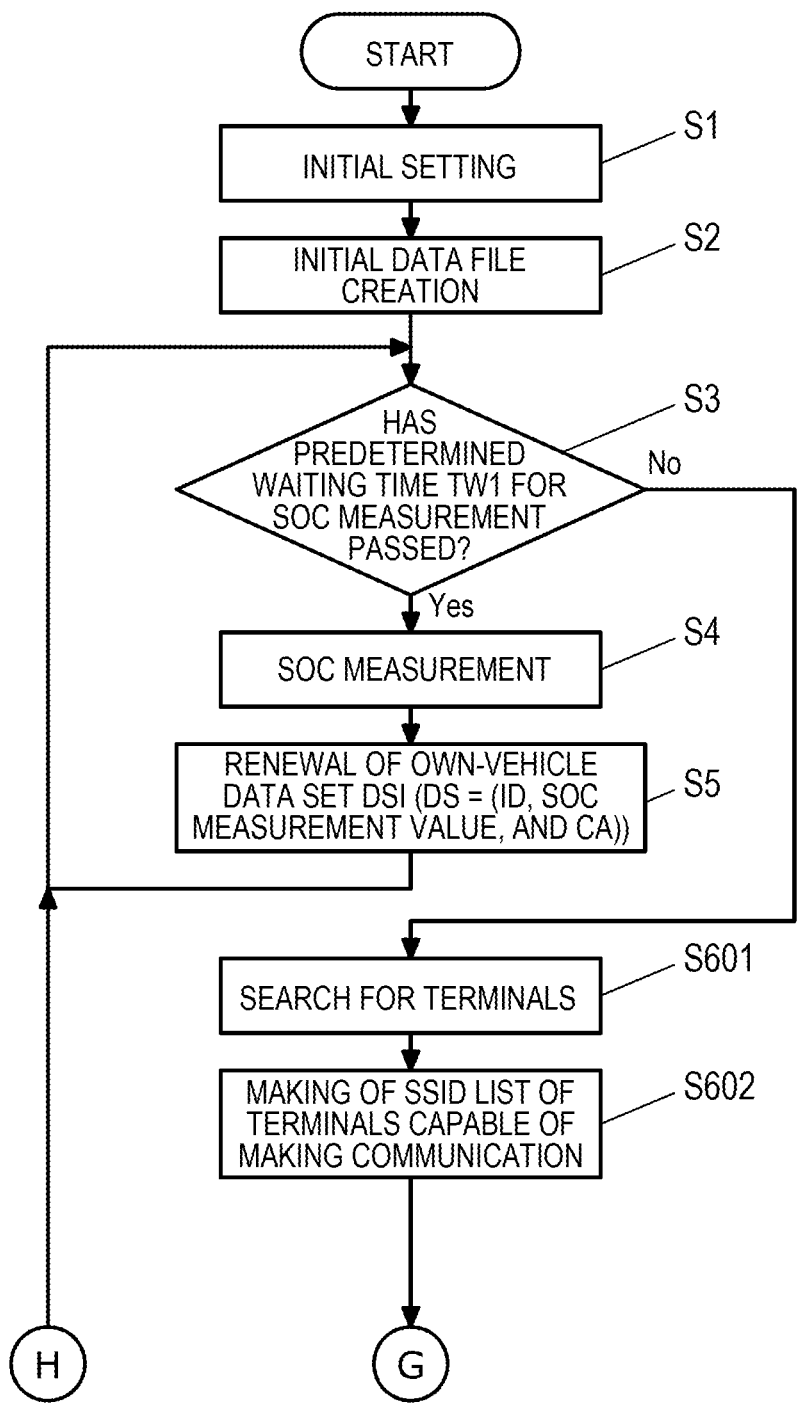
FIG. 14 is the first section of a flow chart of a processing operation of a microprocessor of an on-vehicle diagnosis unit according to embodiment 2 and modified embodiment 2.
Figure 15:
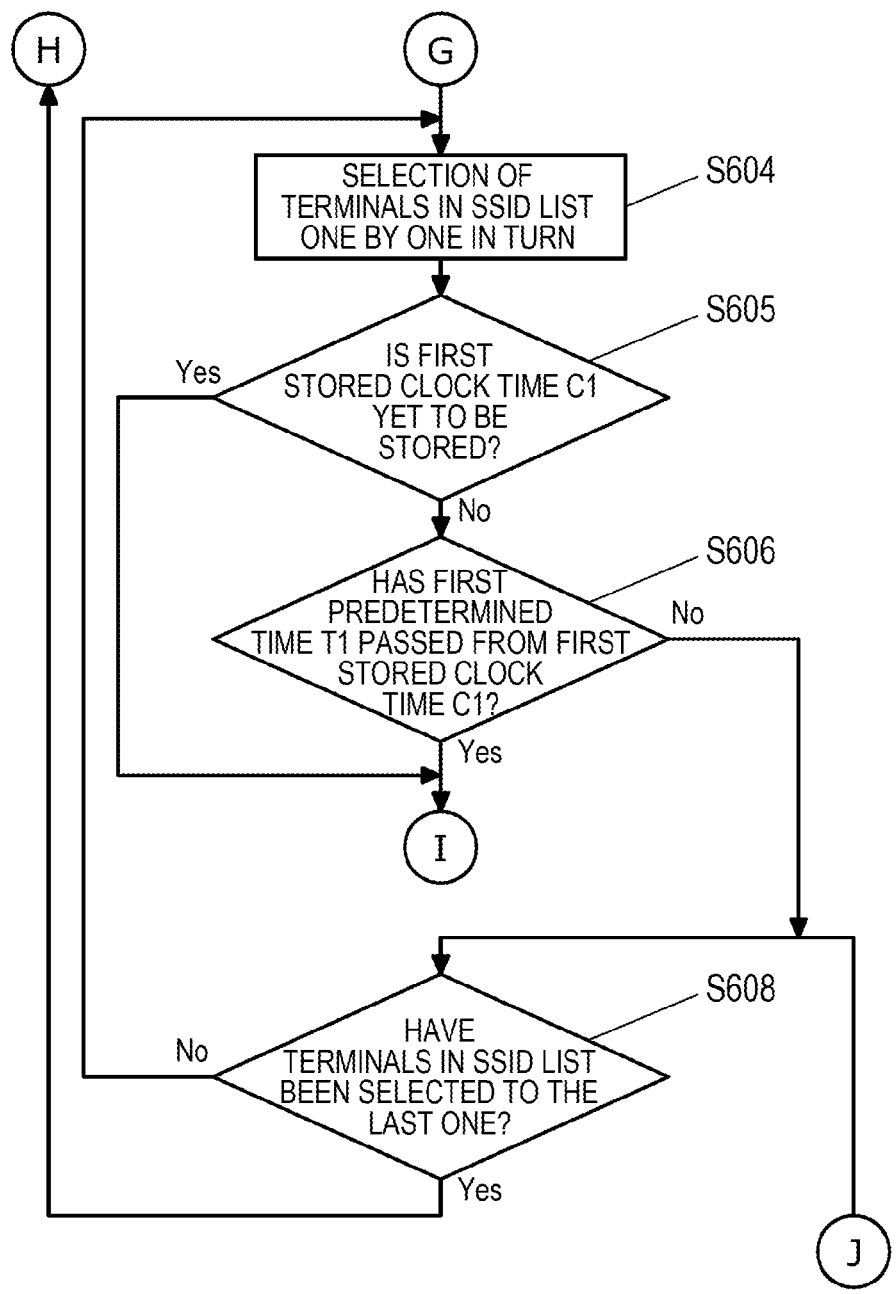
FIG. 15 is the middle section of the flow chart of the processing operation of the microprocessor of the on-vehicle diagnosis unit according to embodiment 2.
Figure 16:
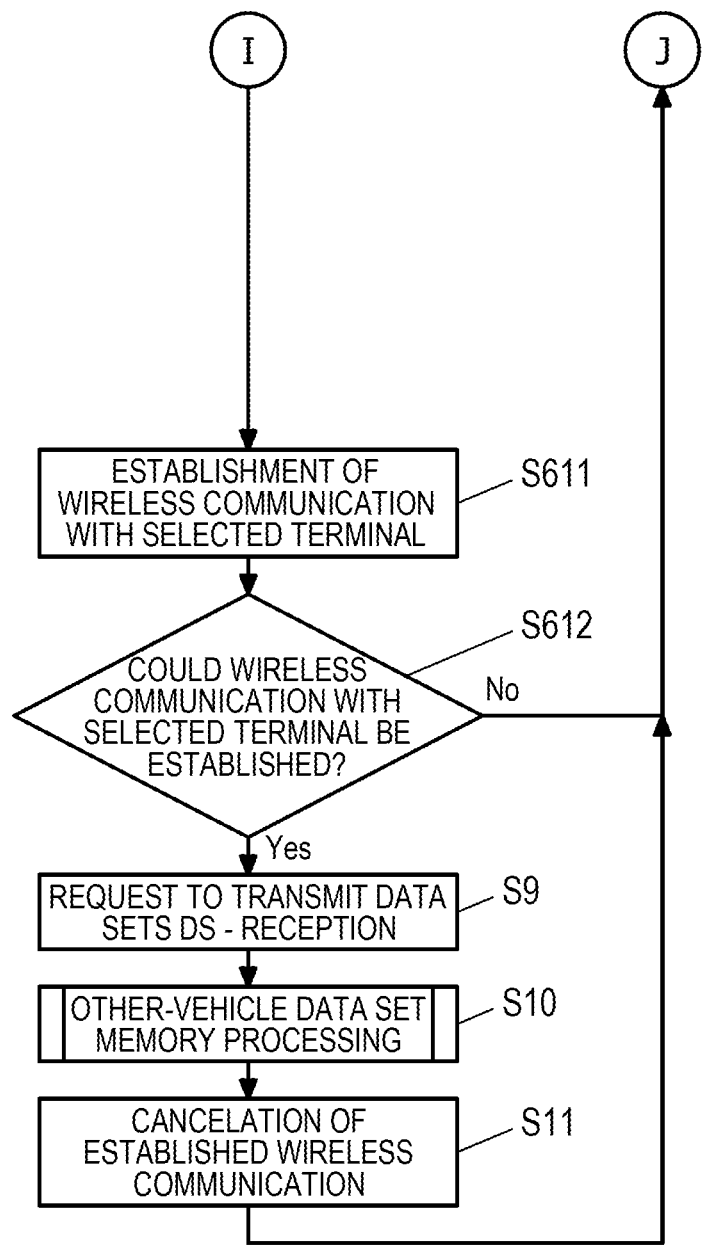
FIG. 16 is the last section of the flow chart of the processing operation of the microprocessor of the on-vehicle diagnosis unit according to embodiment 2.

FIG. 14 to FIG. 16 are a flow chart relating to data set acquisition in the microprocessor 16 of the on-vehicle diagnosis unit 10 according to present embodiment 2. In FIG. 14 to FIG. 16, the same step numbers as those in the flow charts of FIG. 4 to FIG. 6 of embodiment 1 are employed where the same processing as in embodiment 1 is performed. However, unlike embodiment 1, the on-vehicle diagnosis unit 10 according to present embodiment 2 does not make a passage terminal list. Thus, there are no steps corresponding to steps S603, S607, S609, S610, S613, and S614 in embodiment 1.

Upon start of the operation of the microprocessor 16, initial settings of the wireless communication unit 13 and the SOC measurement unit 12 are first made in step S1 in FIG. 14 as is the case of embodiment 1. Next, in step S2, initial data files are created to be stored in the memory 15 (the own-vehicle data-storing unit 15A and the other-vehicle data-storing unit 15B).

Further, in step S3, a determination is made as to whether or not a predetermined waiting time TW1 for SOC measurement (three minutes in present embodiment 2) has passed. When the predetermined waiting time TW1 has passed (Yes), the operation proceeds to step S4. Then, the on-vehicle diagnosis unit 10 measures the SOC of the battery BT, and stores the data set DS containing the acquired SOC measurement value (diagnostic information) in the own-vehicle data-storing unit 15A. Then, after step S5, the operation returns to step S3, and the SOC measurement of the battery BT is repeated at a constant frequency (=three minutes in this example).

However, also when the predetermined waiting time TW1 has not passed (No), the operation proceeds to step S601, and the on-vehicle diagnosis unit 10 searches for the presence or absence of wireless communication units 13, 23 of any other terminals 10, 20 (the other on-vehicle diagnosis units 10 or the tablet terminals 20) that are capable of performing wireless communication therewith as is the case of embodiment 1. In the following step S602, the on-vehicle diagnosis unit 10 makes an SSID list of the found terminals 10, 20 that are capable of performing wireless communication therewith.

Then, because a passage terminal list is not made in present embodiment 2, the operation proceeds directly to step S604 in FIG. 15. Then, the on-vehicle diagnosis unit 10 selects one of the terminals 10, 20 in the SSID list. In repeatedly performing steps S604 to S608, the on-vehicle diagnosis unit 10 selects the terminals 10, 20 in the SSID list one by one in turn in step S604.

Next, in the following step S605, the on-vehicle diagnosis unit 10 checks the first stored clock time C1 stored in relation to each terminal 10, 20 selected in step S604. When a first stored clock time C1 is has not yet been stored in step S605 (Yes), the operation proceeds to step S611 in FIG. 16. However, when the first stored clock time C1 is stored (No), the operation proceeds to step S606.

Then, in the following step S606, the on-vehicle diagnosis unit 10 determines whether or not the local time at this point has passed a first predetermined time T1 (T1=five minutes in present embodiment 2) from the stored first stored clock time C1. When the first predetermined time T1 or more has passed in step S606 (Yes), the operation proceeds to step S611 in FIG. 16. However, when the first predetermined time T1 has not passed (No), the operation proceeds to step S608.

In step S608, the on-vehicle diagnosis unit 10 checks whether or not the terminals 10, 20 in the SSID list have all been selected. When the terminals 10, 20 in the SSID list have not all been selected (No), the operation returns to step S604. Then, the on-vehicle diagnosis unit 10 selects the next terminal 10, 20 among the terminals 10, 20 in the SSID list. However, when the terminals 10, 20 in the SSID list have all been selected (Yes), the operation returns to step S3 in FIG. 14. Then, the on-vehicle diagnosis unit 10 again searches terminals 10, 20 capable of performing wireless communication therewith in step S601 to make an SSID list in step S602.

In the following step S611 in FIG. 16, the on-vehicle diagnosis unit 10 establishes wireless communication with the terminal 10, 20 selected in step S604.

In the following step S612, the on-vehicle diagnosis unit 10 checks whether or not wireless communication could be established with the selected terminal 10, 20. When wireless communication could not be established (No), the operation proceeds to step S608 in FIG. 15, and the on-vehicle diagnosis unit 10 checks whether or not the terminals 10, 20 in the SSID list have all been selected. Then, the operation returns to step S604 or step S3. However, when the wireless communication could be established (Yes), the operation proceeds to step S9.

Steps S9 to S11 are the same as in embodiment 1. A request to transmit and receive data sets DS is made in step S9. The on-vehicle diagnosis unit 10 performs an other-vehicle data set memory processing routine in step S10, and then the established wireless communication is canceled in step S11. Then, after step S11, the operation proceeds to step S608 as in the case of No in step S612. Then, the on-vehicle diagnosis unit 10 checks whether or not the terminals 10, 20 in the SSID list have all been selected. Then, the operation returns to step S604 or step S3.

Next, a detailed description of the operation of one tablet terminal 20 according to present embodiment 2 will be provided.

Figure 17:
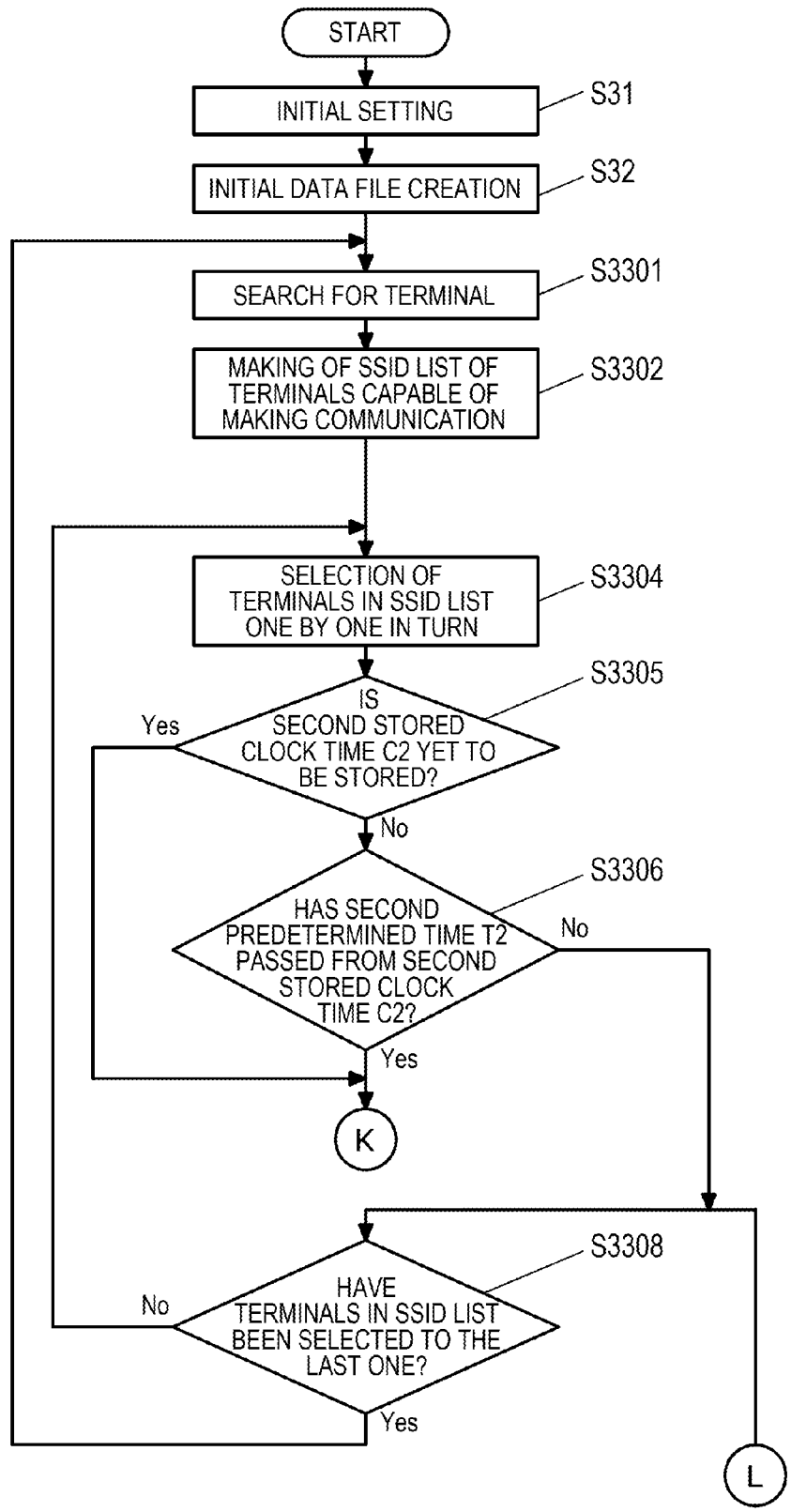
FIG. 17 is the first section of a flow chart of a processing operation of a microprocessor of a tablet terminal according to embodiment 2.
Figure 18:
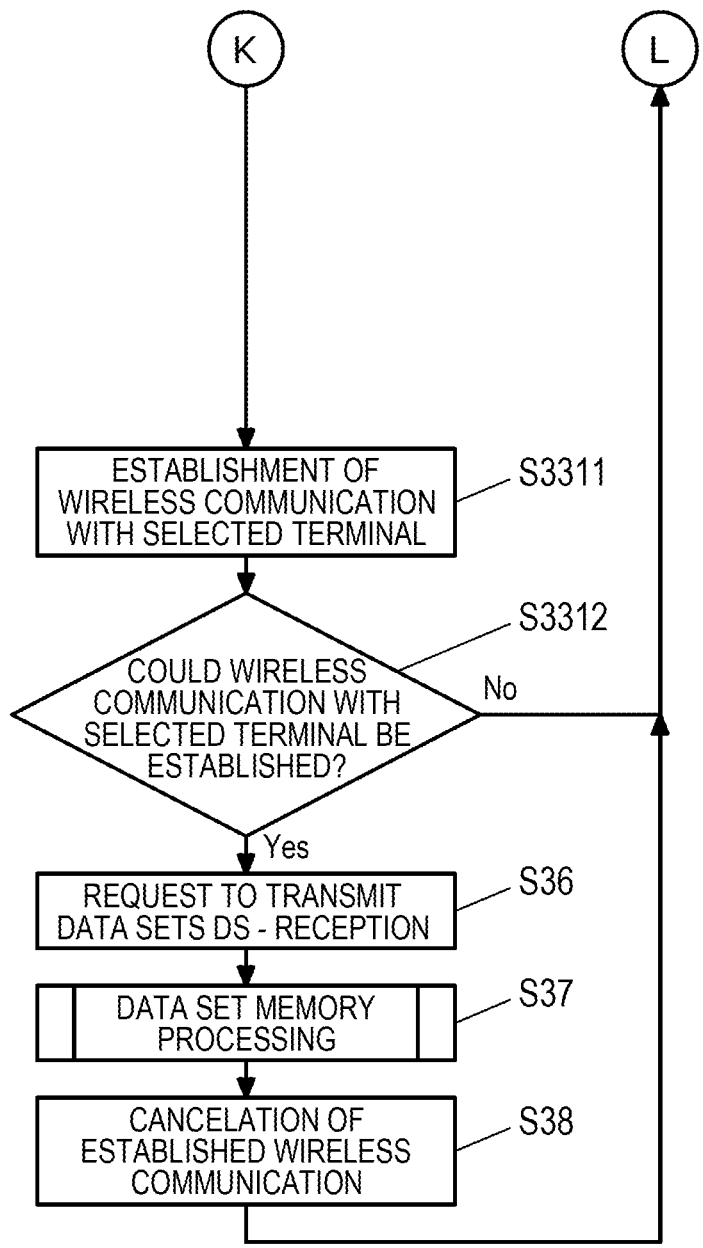
FIG. 18 is the last section of the flow chart of the processing operation of the microprocessor of the tablet terminal according to embodiment 2.

The flow charts of FIG. 17 and FIG. 18 relate to data set acquisition in the microprocessor 26 of the tablet terminal 20 according to present embodiment 2. In FIG. 17 and FIG. 18, the same step numbers as those in FIG. 9 and FIG. 10 of embodiment 1 are employed where the same processing as that in embodiment 1 is performed. However, unlike embodiment 1, the tablet terminal 20 according to present embodiment 2 does not make a passage terminal list as is the case of the on-vehicle diagnosis units 10. Thus, there are no steps corresponding to steps S3303, S3307, S3309, S3310, S3313, and S3314 in embodiment 1.

Upon start of the operation of the microprocessor 26, initial settings of the wireless communication unit 23 are first made in step S31 in FIG. 17 as is the case of embodiment 1. Next, in step S32, initial data files are created to be stored in the memory 25 (the data-storing unit 25A).

Further, the operation proceeds to step S3301, and the tablet terminal 20 searches for the presence or absence of wireless communication units 13, 23 of any other terminals 10, 20 (the on-vehicle diagnosis units 10 or the other tablet terminals 20) that are capable of performing wireless communication therewith. In the following step S3302, the tablet terminal 20 makes an SSID list of the found terminals 10, 20 that are capable of performing wireless communication therewith.

Then, because a passage terminal list is not made in present embodiment 2, the operation proceeds directly to step S3304. Then, the tablet terminal 20 selects one of the terminals 10, 20 in the SSID list. In repeatedly performing steps S3304 to S3308, the tablet terminal 20 selects the terminals 10, 20 in the SSID list one by one in turn in step S3304.

Next, in the following step S3305, the tablet terminal 20 checks the stored second clock time C2 stored in relation to each terminal 10, 20 selected in step S3304. However, when a second stored clock time C2 has not yet been stored in step S3305 (Yes), the operation proceeds to step S3311 in FIG. 18. However, when the second stored clock time C2 is stored (No), the operation proceeds to step S3306.

Then, in the following step S3306, the tablet terminal 20 determines whether or not the local time at this point has passed a second predetermined time T2 (T2=five minutes in present embodiment 2) from the stored second stored clock time C2. When the second predetermined time T2 or more has passed in step S3306 (Yes), the operation proceeds to step S3311 in FIG. 18. However, when the second predetermined time T2 has not passed (No), the operation proceeds to step S3308.

In step S3308, the tablet terminal 20 checks whether or not the terminals 10, 20 in the SSID list have all been selected. When the terminals 10, 20 in the SSID list have not all been selected (No), the operation returns to step S3304. Then, the tablet terminal 20 selects the next terminal 10, 20 among the terminals 10, 20 in the SSID list. However, when the terminals 10, 20 in the SSID list have all been selected (Yes), the operation returns to step S3301. Then, the tablet terminal 20 again searches terminals 10, 20 capable of performing wireless communication therewith to make an SSID list in step S3302.

In addition, in step S3311 in FIG. 18, the tablet terminal 20 establishes wireless communication with the terminal 10, 20 selected in step S3304.

In the following step S3312, the tablet terminal 20 checks whether or not wireless communication could be established with the selected terminal 10, 20. When wireless communication could not be established (No), the operation proceeds to step S3308 in FIG. 17, and the tablet terminal 20 checks whether or not the terminals 10, 20 in the SSID list have all been selected. Then, the operation returns to step S3304 or step S3301. However, when the wireless communication could be established (Yes), the operation proceeds to step S36.

Steps S36 to S38 are the same as in embodiment 1. A request to transmit and receive data sets DS is made in step S36. The tablet terminal 20 performs a data set memory processing routine in step S37, and then the established wireless communication is canceled in step S38. Then, after step S38, the operation proceeds to step S3308 as in the case of No in step S3312. Then, the tablet terminal 20 checks whether or not the terminals 10, 20 in the SSID list have all been selected. Then, the operation returns to step S3304 or step S3301.

In present embodiment 2, in the on-vehicle diagnosis units 10, the microprocessors 16 that perform steps S601 to S612 correspond to the first communication-establishing units. Among the microprocessors 16, the microprocessors 16 that perform steps S601 to S608 correspond to the first searching units, and the microprocessors 16 that perform step S611 correspond to the first establishing units.

Further, among steps S601 to S608 (the first searching units), the microprocessors 16 that perform steps S601 and S602 correspond to the first communicable terminal list-making units, and the microprocessors 16 that perform steps S604 to S606 correspond to the first selecting units. In addition, the SSID lists made in step S602 correspond to the first communicable terminal lists, and the terminals 10, 20 in the SSID lists correspond to the first communicable terminals. In addition, the terminals 10, 20 that are selected from the terminals 10, 20 in the SSID list (the first communicable terminals) in the case of Yes in step S605 or Yes in step S606 correspond to the first planned-connection terminals.

Further, the microprocessors 16 that perform step S608 and steps S604 to S606 correspond to the third selecting units. The terminals 10, 20 that are selected in the case of Yes in step S605 or Yes in step S606 after No is selected in step S608 correspond to the first planned-connection terminals.

In addition, in the tablet terminals 20, the microprocessors 26 that perform steps S3301 to S3312 correspond to the second communication-establishing units. Among the microprocessors 26, the microprocessors 26 that perform steps S3301 to S3308 correspond to the second searching units, and the microprocessors 26 that perform step S3311 correspond to the second establishing units.

Further, among steps S3301 to S3308 (the second searching units), the microprocessors 26 that perform steps S3301 and S3302 correspond to the second communicable terminal list-making units, and the microprocessors 26 that perform steps S3304 to S3306 correspond to the second selecting units. In addition, the SSID lists made in step S3302 correspond to the second communicable terminal lists, and the terminals 10, 20 in the SSID lists correspond to the second communicable terminals. In addition, the terminals 10, 20 that are selected from the terminals 10, 20 in the SSID list (the second communicable terminals) in the case of Yes in step S3305 or Yes in step S3306 correspond to the second planned-connection terminals.

Further, the microprocessors 26 that perform step S3308 and steps S3304 to S3306 correspond to the fourth selecting units. The terminals 10, 20 that are selected in the case of Yes in step S3305 or Yes in step S3306 after No is selected in step S3308 correspond to the second planned-connection terminals.

As described above, in the information sharing system 1 according to present embodiment 2, the on-vehicle diagnosis terminals 10 and the tablet terminals 20 also do not establish wireless communication with the same terminals 10, 20 within the first predetermined time T1 and the second predetermined time T2 as is the case of embodiment 1, which can reduce needless communication among the terminals 10, 20. This configuration can increase the chances of performing communication with different terminals 10, 20, which can promote sharing of the data sets.

In addition, in the information sharing system 1 according to present embodiment 2, the on-vehicle diagnosis terminals 10 and the tablet terminals 20 also make the SSID lists (the first communicable terminal lists and the second communicable terminal lists) as is the case of embodiment 1. Thus, when establishing wireless communication, the on-vehicle diagnosis terminals 10 and the tablet terminals 20 can select appropriate terminals 10, 20 as the first planned-connection terminals and the second planned-connection terminals to perform establishment processing.

Further, in the information sharing system 1 according to present embodiment 2, when wireless communication could not be established with the terminal 10, 20 selected from the SSID list (the first planned-connection terminal)(the first communicable terminal list) (when No is selected in step S612), each of the on-vehicle diagnosis terminals 10 again selects another terminal 10, 20 (another first planned-connection terminal) from the SSID list with use of the third selecting unit (in step S608 and steps S604 to S606).

In addition, in a similar manner, when wireless communication could not be established with the terminal 10, 20 selected from the SSID list (the second planned-connection terminal) (the second communicable terminal list) (when No is selected in step S3312), each of the tablet terminals 20 again selects another terminal 10, 20 (another second planned-connection terminal) from the SSID list with use of the fourth selecting unit (in step S3308 and steps S3304 to S3306).

Thus, in the information sharing system 1 according to present embodiment 2, wireless communication with the first planned-connection terminals and the second planned-connection terminals can easily be established.

In addition, in the information sharing system 1 according to present embodiment 2, when wireless communication could be established in step S611 (with the use of the first establishing unit) (when Yes is selected in step S612), each of the on-vehicle diagnosis terminals 10 acquires the data sets DS, cancels the established wireless communication in steps S9 to S11, and then selects another terminal 10, 20 (another first planned-connection terminal) from the SSID list (the first communicable terminal list) with use of the third selecting unit (in step S608 and steps S604 to S606).

In addition, in a similar manner, also in the case where the wireless communication could be established in step S3311 (with use of the second establishing unit) (when Yes is selected in step S3312), each of the tablet terminals 20 acquires the data sets DS, cancels the established wireless communication in steps S36 to S38, and then selects another terminal 10, 20 (another second planned-connection terminal) from the SSID list (the second communicable terminal list) with use of the fourth selecting unit (in step S3308 and steps S3304 to S3306).

Thus, in the information sharing system 1 according to present embodiment 2, the first planned-connection terminals and the second planned-connection terminals are effectively selected with the use of the SSID lists, and wireless communication can be established.

Modified Embodiment 2

Further, a description of a modified embodiment (a second modified embodiment) of above-described embodiment 2 will be provided with reference to the flow charts of FIG. 14, and FIG. 19 to FIG. 22. Present modified embodiment 2 has the same processing operations in each step as those of embodiment 2, while a part of the flow of the processing operation of the microprocessors 16 of the on-vehicle diagnosis units 10 and a part of the flow of the processing operation of the microprocessors 26 of the tablet terminals 20 are different from embodiment 2. For this reason, explanations of the operation in the steps are omitted or simplified, and descriptions of parts different from embodiment 2 are mainly provided hereinafter.

Figure 19:
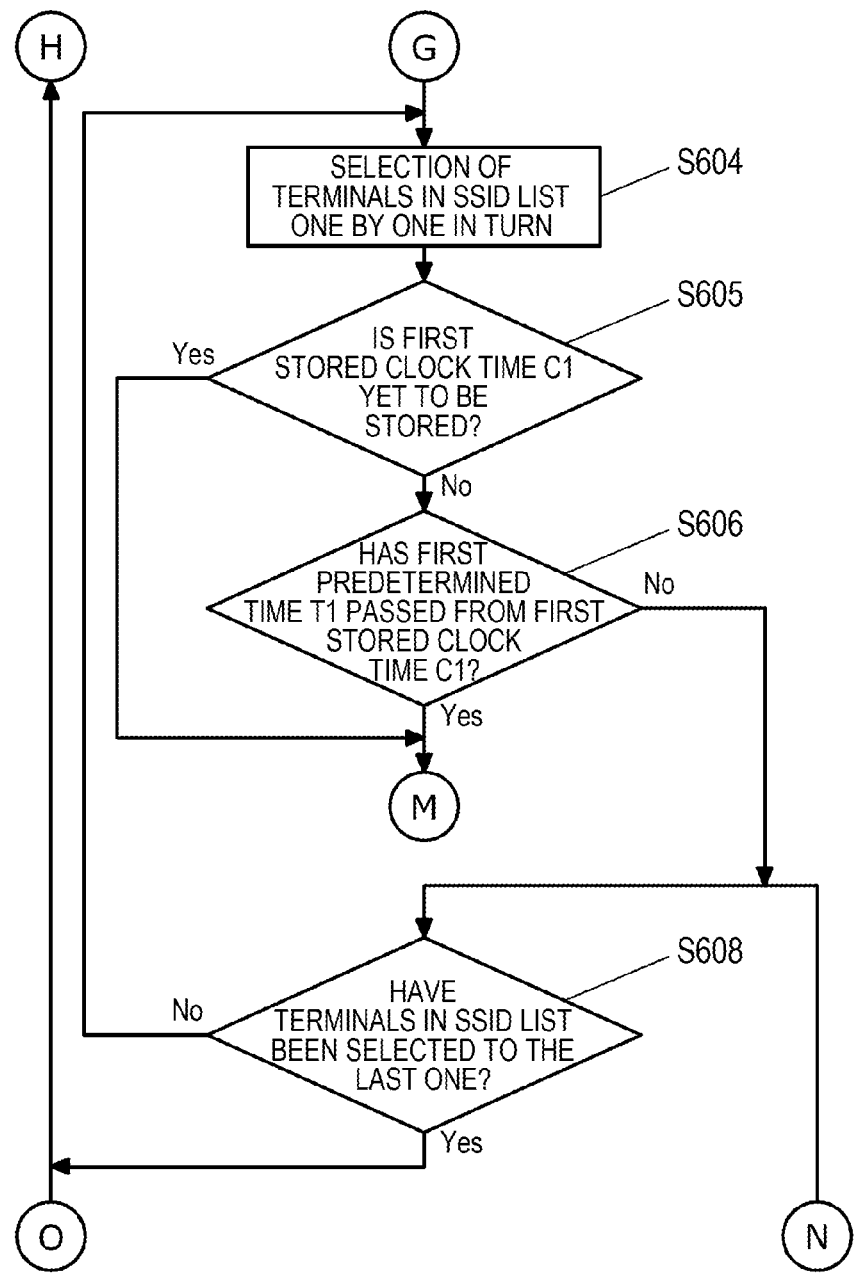
FIG. 19 is the middle section of the flow chart of the processing operation of the microprocessor of the on-vehicle diagnosis unit according to modified embodiment 2.
Figure 20:
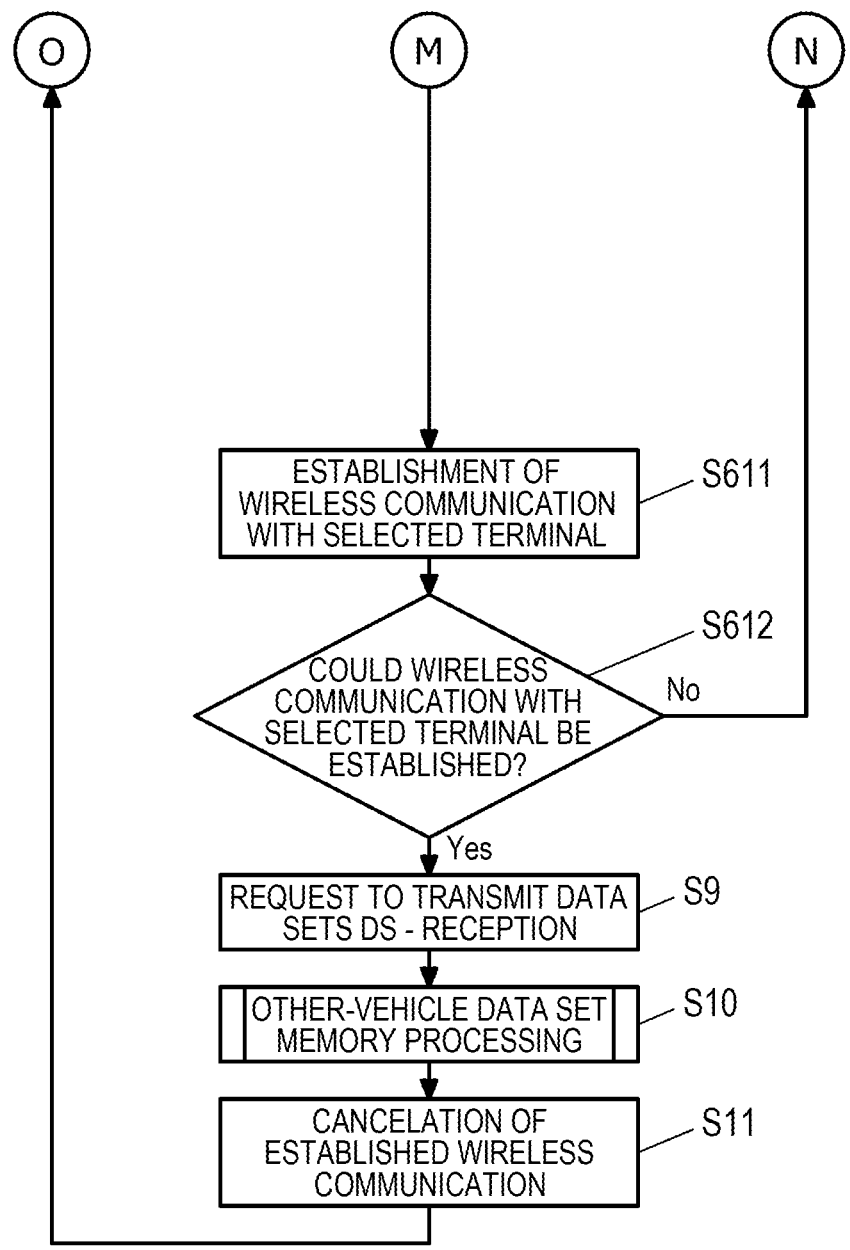
FIG. 20 is the last section of the flow chart of the processing operation of the microprocessor of the on-vehicle diagnosis unit according to modified embodiment 2.

FIG. 14, FIG. 19, and FIG. 20, are a flow chart of the operation relating to data set acquisition in the microprocessor 16 of one on-vehicle diagnosis unit 10 according to present modified embodiment 2. Among them, FIG. 14 is same as embodiment 2. In FIG. 19 and FIG. 20, the same step numbers as those in the flow chart of FIG. 15 and FIG. 16 are assigned to those steps where the same processing as that in embodiment 2 is performed.

In the on-vehicle diagnosis unit 10 according to present modified embodiment 2, upon start of the operation of the microprocessor 16, the SOC measurement is performed in steps S3 to S5, and the SSID list is made in steps S601 and S602 as is the case of embodiment 2 (see FIG. 14). Next, the operation proceeds to step S604 in FIG. 19, and the on-vehicle diagnosis unit 10 selects one of the terminals 10, 20 in the SSID list. Further, in the following step S605, the on-vehicle diagnosis unit 10 checks the first stored clock time C1 stored in relation to the selected terminal 10, 20. Then, when a first stored clock time C1 has not yet been stored in step S605 (Yes), or when the first stored clock time C1 is stored and from which the first predetermined time T1 or more has passed in the following step S606 (Yes), the operation proceeds to step S611 in FIG. 20.

In step S611, the on-vehicle diagnosis unit 10 establishes wireless communication with the terminal 10, 20 selected in step S604, and checks whether or not wireless communication could be established with the selected terminal 10, 20 in the following step S604. When wireless communication could not be established (No), the operation proceeds to step S608 in FIG. 19, and the on-vehicle diagnosis unit 10 checks whether or not the terminals 10, 20 in the SSID list have all been selected. When the terminals 10, 20 in the SSID list have not all been selected (No), the operation returns to step S604. When the terminals 10, 20 in the SSID list have all been selected (Yes), the operation returns to step S3 in FIG. 14. The processing operation until this point is exactly the same as the processing operation performed by the on-vehicle diagnosis units 10 according to embodiment 2.

However, also in the case where when wireless communication could be established in step S612 (Yes), the operation proceeds to step S9 as is the case of embodiment 2. Then, the on-vehicle diagnosis unit 10 performs a request to transmit and receive data sets DS, and then performs an other-vehicle data set memory processing routine in step S10. Further, in the following step S11, the established wireless communication is canceled. However, after step S11, unlike embodiment 2, the operation returns directly to step S3 without proceeding to step S608.

Specifically, in the on-vehicle diagnosis unit 10 according to present modified embodiment 2, when wireless communication could not be established in step S612 (No), the operation proceeds to step S608, and the on-vehicle diagnosis unit 10 checks whether or not the terminals 10, 20 in the SSID list have all been selected as is the case of embodiment 2. Then, when the terminals 10, 20 in the SSID list have not all been selected (No), the operation returns to step S604. Then, the on-vehicle diagnosis unit 10 selects the next terminal 10, 20 among the terminals 10, 20 in the SSID list so as to establish new wireless communication. However, when wireless communication could be established in step S612 (Yes), the data sets DS are received and stored. Then, unlike embodiment 2, the operation returns to step S3, and the on-vehicle diagnosis unit 10 again searches for terminals 10, 20 capable of performing wireless communication therewith in step S601 to make a new SSID list in step S602.

Figure 21:
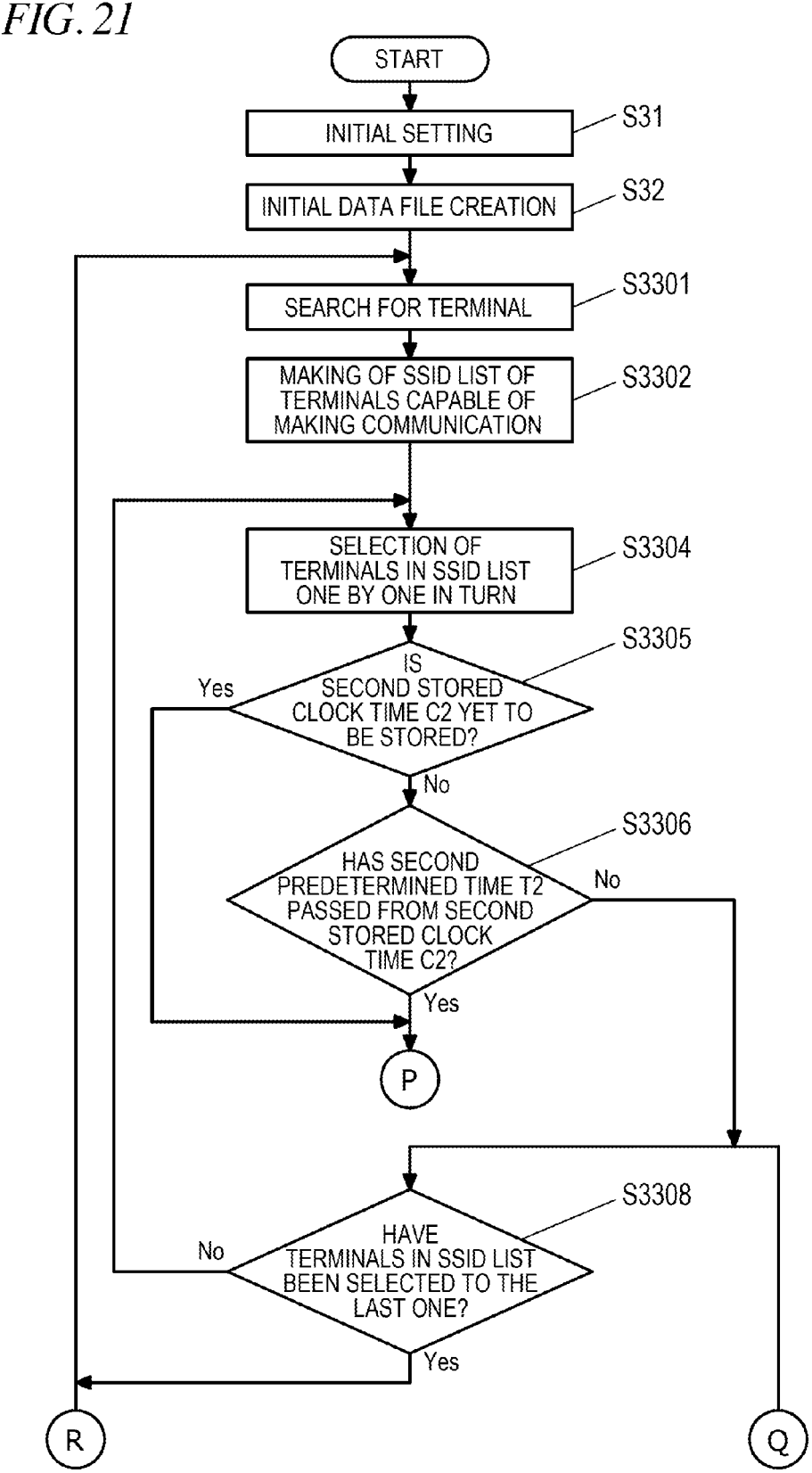
FIG. 21 is the first half of a flow chart of a processing operation of a microprocessor of a tablet terminal according to modified embodiment 2.
Figure 22:
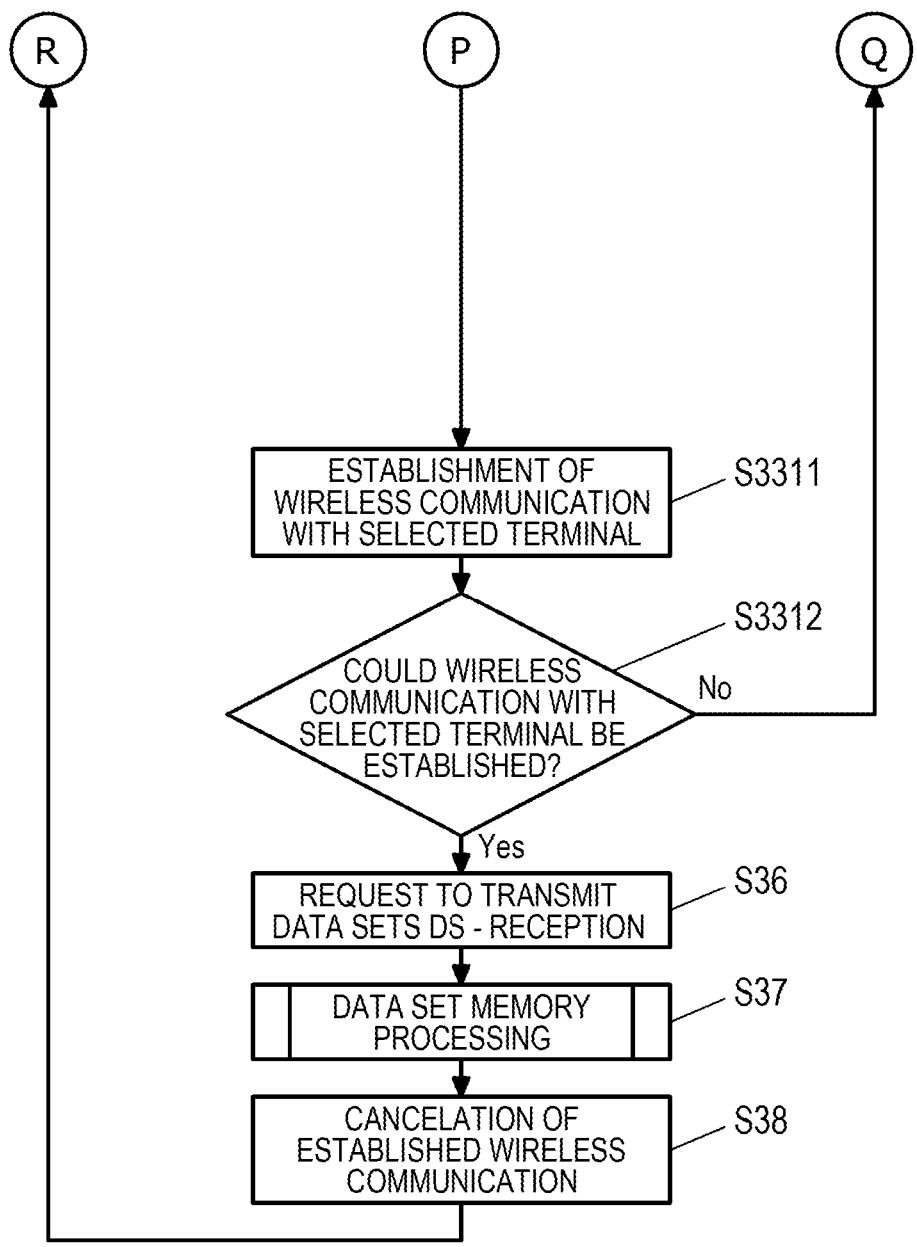
FIG. 22 is the latter half of the flow chart of the processing operation of the microprocessor of the tablet terminal according to modified embodiment 2.

In addition, FIG. 21 and FIG. 22 depict a flow chart of the operation relating to data set acquisition in the microprocessor 26 of one tablet terminal 20 according to the present modified embodiment 2. In FIG. 21 and FIG. 22, the same step numbers as those in the flow chart of FIG. 17 and FIG. 18 are assigned to the steps where processing is the same as that in embodiment 2.

Also in the tablet terminal 20 according to present modified embodiment 2, and like in the on-vehicle diagnosis unit 10, upon start of the operation of the microprocessor 26, the SSID list is made in steps S3301 and S3302, and the tablet terminal 20 selects one of the terminals 10, 20 in the SSID list in the following step S3304 as is the case of embodiment 2 (see FIG. 21). Further, in the following step S3305 the tablet terminal 20 checks the second stored clock time C2 stored in relation to the selected terminal 10, 20. Then, when a second stored clock time C2 has not yet been stored in step S3305 (Yes), or when the second stored clock time C2 is stored and from which the second predetermined time T2 or more has passed in the following step S3306 (Yes), the operation proceeds to step S3311 in FIG. 22.

In step S3311, the tablet terminal 20 establishes wireless communication with the terminal 10, 20 selected in step S3304, and checks whether or not wireless communication could be established with the selected terminal 10, 20 in the following step S3312. When the wireless communication could not be established (No), the operation proceeds to step S3308 in FIG. 21, and the tablet terminal 20 checks whether or not the terminals 10, 20 in the SSID list have all been selected. When the terminals 10, 20 in the SSID list have not all been selected (No), the operation returns to step S3304. When the terminals 10, 20 in the SSID list have all been selected (Yes), the operation returns to step S3301. The processing operation until this point is exactly the same as the processing operation performed by the tablet terminals 20 according to embodiment 2 as is the case of the on-vehicle diagnosis units 10.

However, also in the case where the wireless communication could be established in step S3312 (Yes), the operation proceeds to step S36 as is the case of embodiment 2. Then, the tablet terminal 20 performs a request to transmit and receive data sets DS, and then performs a data set memory processing routine in step S37. Further, in the following step S38, the established wireless communication is canceled. However, after step S38, the operation returns directly to step S3301 without proceeding to step S3308 unlike embodiment 2.

Specifically, in the tablet terminal 20 according to present modified embodiment 2, when wireless communication could not be established in step S3312 (No), the operation proceeds to step S3308, and the tablet terminal 20 checks whether or not the terminals 10, 20 in the SSID list have all been selected as is the case of embodiment 2. Then, when the terminals 10, 20 in the SSID list have not all been selected (No), the operation returns to step S3304. Then, the tablet terminal 20 selects the next terminal 10, 20 among the terminals 10, 20 in the SSID list so as to establish new wireless communication. However, when wireless communication could be established in step S3312 (Yes), the data sets DS are received and stored. Then, unlike embodiment 2, the operation returns to step S3301, and the tablet terminal 20 again searches for terminals 10, 20 capable of performing wireless communication therewith to make a new SSID list in step S3302.

Thus, in the information sharing system 1 also according to present modified embodiment 2, each of the on-vehicle diagnosis units 10 makes the SSID list, and when wireless communication could not be established with the terminal 10, 20 selected from the SSID list (the first planned-connection terminal) (when No is selected in step S612), the on-vehicle diagnosis unit 10 again selects another terminal 10, 20 (another first planned-connection terminal) from the SSID list with use of the third selecting unit (in step S608 and steps S604 to S606) as is the case of embodiment 2.

In addition, in a similar manner, when each of the tablet terminals 20 makes the SSID list, and wireless communication could not be established with a terminal 10, 20 selected from the SSID list (the second planned-connection terminal) (when No is selected in step S3312), each of the tablet terminals 20 again selects another terminal 10, 20 (another second planned-connection terminal) from the SSID list with use of the fourth selecting unit (in step S3308 and steps S3304 to S3306).

Thus, in the information sharing system 1 according to present modified embodiment 2, wireless communication with the first planned-connection terminals and the second planned-connection terminals can also be easily established, and the same working effects as embodiment 2 are produced.

However, in the information sharing system 1 according to present modified embodiment 2, unlike embodiment 2, in the case where wireless communication could be established in step S611 (with use of the first establishing unit) (when Yes is selected in step S612), each of the on-vehicle diagnosis terminals 10 cancels the wireless communication established in step S11. Then, the operation returns to step S3, and each of the on-vehicle diagnosis terminals 10 makes a new SSID list. In addition, in a similar manner, when wireless communication could be established in step S3311 (with use of the second establishing unit) (when Yes is selected in step S3312), each of the tablet terminals 20 then cancels the wireless communication established in step S38. Then, the operation returns to step S3301, and each of the tablet terminals 20 makes a new SSID list.

Thus, in present modified embodiment 2, after having stored the data sets DS in the other-vehicle data-storing units 15B and in the data-storing units 25A, new SSID lists are made, and diagnostic information acquisition is achieved based on the newly made lists.

In the above description, the present invention has been explained based on the information sharing systems 1 according to embodiments 1 and 2 and modified embodiments 1 and 2, and the on-vehicle diagnosis units 10 that define on-vehicle diagnosis terminals and the tablet terminals 20 that define display terminals that are used in the information sharing systems 1. However, the above description is not intended to limit the present invention to above-described embodiment 1 and the like, and modifications and variations may be made as long as they do not deviate from the principles of the present invention.

For example, while a plurality of tablet terminals 20 (20A, 20B) are used as the display terminals in embodiment 1 and the like, fixed personal computer terminals may be used as the display terminals.

In addition, embodiment 1 and the like describes an information sharing system 1 including the plurality of tablet terminals 20 (20A, 20B) where the on-vehicle diagnosis units 10 are capable of acquiring the data sets DS from any other on-vehicle diagnosis units 10 and the tablet terminals 20, while the tablet terminals 20 are capable of acquiring the data sets DS from the on-vehicle diagnosis units 10 and any other tablet terminals 20. In contrast, the information sharing system 1 may be a system including only one display terminal such as a tablet terminal 20 and a PC terminal, that is, a system where there is no communication between display terminals (tablet terminals 20).

In addition, embodiment 1 and the like describes a system where the terminals 10, 20 can also acquire the data sets DS from the tablet terminals 20. However, the information sharing system 1 may be a system where on-vehicle diagnosis units 10 are not capable of acquiring data sets DS from display terminals 20 while being capable of acquiring data sets DS only from any other on-vehicle diagnosis units 10, and where the display terminals 20 are not capable of acquiring data sets DS from any other display terminals 20 while being capable of acquiring data sets DS only from the on-vehicle diagnosis units 10. In this case, the other ends with which the on-vehicle diagnosis units 10 and the display terminals 20 establish wireless communication to acquire the data sets DS are only the on-vehicle diagnosis units 10.

In addition, in embodiment 1 and the like, the diagnostic information on the carts EV is the states of charge (SOC) of the batteries BT. However, in addition to this, diagnostic information such as the temperatures of the batteries BT and air pressure in the tires (having a flat tire or not) may be acquired. In addition, electric vehicles to which the on-vehicle diagnosis units 10 are mounted may be electric carts used in a hospital or amusement park facilities and retirement communities in addition to the golf carts in the embodiments.

In addition, in embodiment 1 and the like, the common time is uniquely set in the information sharing system 1 when setting the common time, and the local clock 14, 24 provided to the terminals 10, 20 is used. However, when setting the common time, a clock time acquired from a remote clock such as a GPS satellite, or a clock time acquired from a clock time site on the Internet may be used.

In addition, in embodiment 1 and the like, the wireless communication units 13, 23 of the terminals 10, 20 perform peer-to-peer wireless communication using Wi-Fi Direct. However, another communication protocol such as an ad hoc mode that defines an operation mode of an IEEE 802.11 wireless LAN protocol that is capable of performing peer-to-peer wireless communication may be used.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on U.S. Provisional Application No. 61/982,005 filed Apr. 21, 2014, incorporated herein by reference in their entirety.

What is claimed is:

1. An information sharing system comprising a plurality of on-vehicle diagnosis terminals, and one or a plurality of display terminals, the on-vehicle diagnosis terminals and the one or the plurality of display terminals comprising a terminal that comprises a communication unit comprising a first communication unit and a second communication unit, each configured to perform peer-to-peer wireless communication, the on-vehicle diagnosis terminals comprising:
the first communication unit; and
a diagnostic information-acquiring unit configured to acquire diagnostic information on an electric vehicle equipped with the on-vehicle diagnosis terminal,
the one or the plurality of display terminals comprising:
the second communication unit; and
a display configured to display the diagnostic information of the electric vehicles equipped with the on-vehicle diagnosis terminals,
the on-vehicle diagnosis terminals and the one or the plurality of display terminals sharing the diagnostic information among the terminals of the electric vehicles equipped with the on-vehicle diagnosis terminals, over wireless communication, which is performed using the first and second communication units,
wherein the on-vehicle diagnosis terminals comprise:
a first clock unit that keeps a common time that is unified in the information sharing system;
an own-vehicle data-storing unit configured to store an own-vehicle data set that comprises a data set comprising a unique identifier that is uniquely assigned to the on-vehicle diagnosis terminal, the diagnostic information acquired by the diagnostic information-acquiring unit of the on-vehicle diagnosis terminal, and an acquisition clock time in the common time at which the diagnostic information is acquired; and
an other-vehicle data-storing unit configured to store other-vehicle data sets that comprise the data sets of other electric vehicles that are acquired through the first communication unit of the on-vehicle diagnosis terminal,
wherein the one or the plurality of display terminals comprise:
a second clock unit that keeps the common time; and
a data-storing unit configured to store the data sets of the electric vehicles that are acquired through the second communication unit of the display terminal,
wherein the on-vehicle diagnosis terminals comprise:
a first communication-establishing unit configured to establish peer-to-peer wireless communication with the communication units of the terminals capable of establishing wireless communication with the on-vehicle diagnosis terminal;
a first newly-storing unit configured to make the other-vehicle data-storing unit of the on-vehicle diagnosis terminal store a data set comprising a unique identifier that is not stored in the other-vehicle data-storing unit of the on-vehicle diagnosis terminal among the data sets related to first terminals where wireless communication has been established with the on-vehicle diagnosis terminal;
a first renewing-and-storing unit configured to make the other-vehicle data-storing unit of the on-vehicle diagnosis terminal renew and store the data set that comprises a unique identifier which is the same as a unique identifier of the other-vehicle data set already stored in the other-vehicle data-storing unit of the on-vehicle diagnosis terminal, and a newer acquisition clock time among the data sets stored in the first terminals; and
a first clock time-storing unit configured to renew and store, every time the data sets stored in each first terminal are stored in the other-vehicle data-storing unit of the on-vehicle diagnosis terminal, a first stored clock time in the common time for every first terminal, the first stored clock time being the time of storage,
wherein the one or the plurality of display terminals comprise:
a second communication-establishing unit configured to establish peer-to-peer wireless communication with the communication units of the terminals capable of establishing wireless communication with the display terminal;
a second newly-storing unit configured to make the data-storing unit of the display terminal store a data set comprising a unique identifier that is not stored in the data-storing unit of the display terminal among the data sets stored in second terminals that comprise the terminals where wireless communication has been established with the display terminal;
a second renewing-and-storing unit configured to renew and store the data set that comprises a unique identifier which is the same as the unique identifier of a data set stored in the data-storing unit of the display terminal, and a newer acquisition clock time among the data sets stored in the second terminals; and a second clock time-storing unit configured to renew and store, every time the data sets stored in each second terminal are stored in the data-storing unit of the display terminal, a second stored clock time in the common time for every second terminal, the second stored clock time being the time of storage, wherein the first communication-establishing units of the on-vehicle diagnosis terminals comprise:

a first searching unit configured to search a first planned-connection terminal among the terminals, the first planned-connection terminal being capable of establishing wireless communication with the on-vehicle diagnosis terminal, the first planned-connection terminal comprising one of not having a first stored clock time stored in the on-vehicle diagnosis terminal, or a first stored clock time that is stored in the on-vehicle diagnosis terminal and from which a first predetermined time has passed at the time of searching; and a first establishing unit configured to establish peer-to-peer wireless communication with the communication unit of the first planned-connection terminal, and wherein the second communication-establishing units of the display terminals comprise:

a second searching unit configured to search a second planned-connection terminal among the terminals, the second planned-connection terminal being capable of establishing wireless communication with the display terminal, the second planned-connection terminal comprising one of not having a second stored clock time stored in the display terminal, or a second stored clock time that is stored in the display terminal and from which a second predetermined time has passed at the time of searching; and a second establishing unit configured to establish peer-to-peer wireless communication with the communication unit of the second planned-connection terminal.

2. The information sharing system as claimed in claim 1, wherein the first searching units of the on-vehicle diagnosis terminals comprise:

a first communicable terminal list-making unit configured to search first communicable terminals capable of establishing wireless communication with the on-vehicle diagnosis terminal, and to make a first communicable terminal list; and a first selecting unit configured to select one first planned-connection terminal from the first communicable terminal list, and wherein the second searching units of the display terminals comprise:

a second communicable terminal list-making unit configured to search second communicable terminals capable of establishing wireless communication with the display terminal, and to make a second communicable terminal list; and a second selecting unit configured to select one second planned-connection terminal from the second communicable terminal list.

3. The information sharing system as claimed in claim 2, wherein the on-vehicle diagnosis terminals comprise a third selecting unit configured to select, when the wireless communication with the communication unit of the first planned-connection terminal could not be established with use of the first establishing unit, another planned-connection terminal from the first communicable terminal list, and wherein the display terminals comprise a fourth selecting unit configured to select, when the wireless communication with the communication unit of the second planned-connection terminal could not be established with use of the second establishing unit, another second planned-connection terminal from the second communicable terminal list.

4. The information sharing system as claimed in claim 3, wherein also for the case when wireless communication with the communication unit of the first planned-connection terminal could be established with use of the first establishing unit, each of the on-vehicle diagnosis terminals is configured to, when selecting a different planned-connection terminal, use the third selecting unit, and wherein also for the case when wireless communication with the communication unit of the second planned-connection terminal could be established with use of the second establishing unit, each of the display terminals is configured to, when selecting a different second planned-connection terminal, use the fourth selecting unit.

5. The information sharing system as claimed in claim 2, wherein the first selecting units of the on-vehicle diagnosis terminals comprise:

a first passage list-making unit configured to make, from the first communicable terminal list, a first passage terminal list of first passage terminals comprising one of not having a first stored clock time stored in the on-vehicle diagnosis terminal, or a first stored clock time that is stored in the on-vehicle diagnosis terminal and from which, at the time of list creation, the first predetermined time has passed; and a first terminal selecting unit configured to select one first planned-connection terminal from the first passage terminal list, and wherein the second selecting units of the display terminals comprise:

a second passage list-making unit configured to make, from the second communicable terminal list, a second passage terminal list of second passage terminals comprising one of not having a second stored clock time stored in the display terminal, or a second stored clock time that is stored in the display terminal and from which, at the time of list creation, the second predetermined time has passed; and a second terminal selecting unit configured to select one second planned-connection terminal from the second passage terminal list.

6. The information sharing system as claimed in claim 5, wherein the on-vehicle diagnosis terminals comprise a third terminal selecting unit configured to select, when wireless communication with the communication unit of the first planned-connection terminal could not be established with use of the first establishing unit, another planned-connection terminal from the first passage terminal list, and wherein the display terminals comprise a fourth terminal selecting unit configured to select, when wireless communication with the communication unit of the second planned-connection terminal could not be established with use of the second establishing unit, another second planned-connection terminal from the second passage terminal list.

7. The information sharing system as claimed in claim 6, wherein also for the case when the wireless communication with the communication unit of the first planned-connection terminal could be established with use of the first establishing unit, each of the on-vehicle diagnosis terminals is configured to, when selecting a different planned-connection terminal, use the third terminal selecting unit, and wherein also for the case when the wireless communication with the communication unit of the second planned-connection terminal could be established with use of the second establishing unit, each of the display terminals is configured to, when selecting a different second planned-connection terminal, use the fourth terminal selecting unit.

8. The information sharing system as claimed in claim 1, wherein the one or the plurality of display terminals comprise a plurality of display terminals, and wherein each of the second communication-establishing units of the display terminals establishes wireless communication with any one of the first communication units of the on-vehicle diagnosis terminals and the second communication units of the display terminals.

9. The information sharing system as claimed in claim 1, wherein the diagnostic information-acquiring units of the on-vehicle diagnosis terminals comprise an SOC information-acquiring unit configured to acquire information on the state of charge of a battery mounted to the electric vehicle equipped with the diagnostic information-acquiring unit.

10. The information sharing system as claimed in claim 1, wherein each of the first clock units and the second clock units keeps a local time used only in the information sharing system as the common time.

11. An on-vehicle diagnosis terminal for use in an information sharing system comprising a plurality of on-vehicle diagnosis terminals, and one or a plurality of display terminals, the on-vehicle diagnosis terminals and the one or the plurality of display terminals comprising a terminal that comprises a communication unit including one of first and second communication units configured to perform peer-to-peer wireless communication, wherein the on-vehicle diagnosis terminals comprise:
the first communication unit; and
a diagnostic information-acquiring unit configured to acquire diagnostic information on an electric vehicle equipped with the on-vehicle diagnosis terminal, wherein the one or the plurality of display terminals comprise:
the second communication unit; and
a display configured to display the diagnostic information on the electric vehicles equipped with the on-vehicle diagnosis terminals, the on-vehicle diagnosis terminals and the one or the plurality of display terminals sharing the diagnostic information on the electric vehicles equipped with the on-vehicle diagnosis terminals over wireless communication among the terminals, which is performed using the communication units, wherein the on-vehicle diagnosis terminal used in the information sharing system comprises:
a first clock unit that keeps common time that is unified in the information sharing system;
an own-vehicle data-storing unit configured to store an own-vehicle data set that comprises a data set comprising a unique identifier that is uniquely assigned to the on-vehicle diagnosis terminal, the diagnostic information acquired by the diagnostic information-acquiring unit of the on-vehicle diagnosis terminal, and an acquisition clock time in the common time at which the diagnostic information is acquired;
an other-vehicle data-storing unit configured to store other-vehicle data sets that comprise the data sets on other electric vehicles that are acquired through the first communication unit of the on-vehicle diagnosis terminal;
a first communication-establishing unit configured to establish peer-to-peer wireless communication with the communication units of the terminals capable of establishing wireless communication with the on-vehicle diagnosis terminal;
a first newly-storing unit configured to make the other-vehicle data-storing unit of the on-vehicle diagnosis terminal store a data set comprising a unique identifier that is not stored in the other-vehicle data-storing unit of the on-vehicle diagnosis terminal among the data sets stored in first terminals that comprise the terminals where wireless communication has been established with the on-vehicle diagnosis terminal;
a first renewing-and-storing unit configured to make the other-vehicle data-storing unit of the on-vehicle diagnosis terminal renew and store the data set that comprises the unique identifier which is the same as the unique identifier of the other-vehicle data set stored in the other-vehicle data-storing unit of the on-vehicle diagnosis terminal, and has a newer acquisition clock time among the data sets stored in the first terminals; and
a first clock time-storing unit configured to renew and store, every time the data sets stored in each first terminal are stored in the other-vehicle data-storing unit of the on-vehicle diagnosis terminal, a first stored clock time in the common time for every first terminal, the first stored clock time being the time of storage, and wherein the first communication-establishing unit of each of the on-vehicle diagnosis terminals comprises:
a first searching unit configured to search a first planned-connection terminal among the terminals, the first planned-connection terminal being capable of establishing wireless communication with the on-vehicle diagnosis terminal, the first planned-connection terminal comprising one of not having a first stored clock time stored in the on-vehicle diagnosis terminal, or a first stored clock time that is stored in the on-vehicle diagnosis terminal and from which a first predetermined time has passed at the time of searching; and
a first establishing unit configured to establish peer-to-peer wireless communication with the communication unit of the first planned-connection terminal.

12. A display terminal for use in an information sharing system comprising a plurality of on-vehicle diagnosis terminals, and one or a plurality of display terminals, the on-vehicle diagnosis terminals and the one or the plurality of display terminals comprising a terminal that comprises a communication unit including one of first and second communication units configured to perform peer-to-peer wireless communication, wherein the on-vehicle diagnosis terminals comprise:
  the first communication unit;
  a diagnostic information-acquiring unit configured to acquire diagnostic information on an electric vehicle equipped with the on-vehicle diagnosis terminal;
  a first clock unit that keeps common time that is unified in the information sharing system;
  an own-vehicle data-storing unit configured to store an own-vehicle data set that comprises a data set comprising a unique identifier that is uniquely assigned to the on-vehicle diagnosis terminal, the diagnostic information acquired by the diagnostic information-acquiring unit of the on-vehicle diagnosis terminal, and an acquisition clock time in the common time at which the diagnostic information is acquired; and
  an other-vehicle data-storing unit configured to store other-vehicle data sets that comprise the data sets on other electric vehicles that are acquired through the first communication unit of the on-vehicle diagnosis terminal,
wherein the one or the plurality of display terminals comprise:
  the second communication unit; and
  a display configured to display the diagnostic information on the electric vehicles equipped with the on-vehicle diagnosis terminals,
the on-vehicle diagnosis terminals and the one or the plurality of display terminals sharing the diagnostic information on the electric vehicles equipped with the on-vehicle diagnosis terminals over wireless communication among the terminals, which is performed using the communication units,
wherein the display terminal used in the information sharing system comprises:
  a second clock unit that keeps the common time;
  a data-storing unit configured to store data sets on the electric vehicles that are acquired through the second communication unit of the display terminal;
  a second communication-establishing unit configured to establish peer-to-peer wireless communication with the communication units of the terminals capable of establishing wireless communication with the display terminal;
  a second newly-storing unit configured to make the data-storing unit of the display terminal store a data set comprising a unique identifier that is not stored in the data-storing unit of the display terminal among the data sets stored in second terminals that comprise the terminals where wireless communication has been established with the display terminal;
  a second renewing-and-storing unit configured to make the data-storing unit of the display terminal renew and store the data set that comprises the unique identifier which is the same as the unique identifier of the data set stored in the data-storing unit of the display terminal, and has a newer acquisition clock time among the data sets stored in the second terminals; and
  a second clock time-storing unit configured to renew and store, every time the data sets stored in each second terminal are stored in the data-storing unit of the display terminal, a second stored clock time in the common time for every second terminal, the second stored clock time being the time of storage, and
wherein the second communication-establishing unit of the display terminal comprises:
  a second searching unit configured to search a second planned-connection terminal among the terminals, the second planned-connection terminal being capable of establishing wireless communication with the display terminal, the second planned-connection terminal comprising one of not having a second stored clock time stored in the display terminal, or a second stored clock time that is stored in the display terminal and from which a second predetermined time has passed at the time of the searching; and
  a second establishing unit configured to establish peer-to-peer wireless communication with the communication unit of the second planned-connection terminal.

* * * * *